(12) United States Patent
Le et al.

(10) Patent No.: US 7,330,931 B2
(45) Date of Patent: Feb. 12, 2008

(54) METHOD AND SYSTEM FOR ACCESSING AUXILIARY DATA IN POWER-EFFICIENT HIGH-CAPACITY SCALABLE STORAGE SYSTEM

(75) Inventors: Kim B. Le, Broomfield, CO (US); Jeffrey Cousins, Louisville, CO (US); Aloke Guha, Louisville, CO (US)

(73) Assignee: Copan Systems, Inc., Longmont, CO (US)

( * ) Notice: Subject to any disclaimer, the term of this patent is extended or adjusted under 35 U.S.C. 154(b) by 0 days.

(21) Appl. No.: 11/322,787

(22) Filed: Dec. 30, 2005

(65) Prior Publication Data

US 2006/0136684 A1 Jun. 22, 2006

Related U.S. Application Data

(63) Continuation-in-part of application No. 10/607,932, filed on Jun. 26, 2003, now Pat. No. 7,035,972.

(51) Int. Cl.
*G06F 12/00* (2006.01)
(52) U.S. Cl. ............ 711/114; 711/111; 711/112; 711/154; 711/161; 713/320; 714/5
(58) Field of Classification Search ........... 711/114, 711/112, 111, 154, 161; 713/320; 714/5
See application file for complete search history.

(56) References Cited

U.S. PATENT DOCUMENTS 5,088,081 A 2/1992 Farr

| | | |
|---|---|---|
| 5,530,658 A | 6/1996 | Hafner et al. |
| 5,666,538 A | 9/1997 | DeNicola |
| 5,680,579 A | 10/1997 | Young et al. |
| 5,787,462 A | 7/1998 | Hafner et al. |
| 5,961,613 A | 10/1999 | DeNicola |
| 7,149,858 B1 * | 12/2006 | Kiselev ............... 711/162 |
| 2002/0007464 A1 | 1/2002 | Fung |
| 2002/0062454 A1 | 5/2002 | Fung |
| 2002/0144057 A1 | 10/2002 | Li et al. |
| 2003/0196126 A1 | 10/2003 | Fung |

(Continued)

OTHER PUBLICATIONS

Tanenbaum, "Structured Computer Organization," Third Edition, Section 1.4—Hardware, Software, and Multilevel Machines, Prentice Hall, p. 11, 1990.*

(Continued)

*Primary Examiner*—Stephen C. Elmore
(74) *Attorney, Agent, or Firm*—Trellis Intellectual Property Law Group, PC; Charles J Kulas

(57) ABSTRACT

A method for preparing data units for access in a data storage system is disclosed. The data storage system includes multiple storage devices having data units. All the storage devices of the data storage system are not powered on at the same time. The method includes preparing and storing the auxiliary data. The auxiliary data is prepared for a data unit on a storage device that will be powered off during an access request of the data unit. The auxiliary data is stored on the storage devices so that the auxiliary data is likely to be available on a powered-on storage device when the data unit is the subject of an access request.

38 Claims, 23 Drawing Sheets

U.S. PATENT DOCUMENTS

2003/0200473 A1    10/2003    Fung
2005/0177755 A1     8/2005    Fung
2006/0047713 A1*    3/2006    Gornshtein et al. ......... 707/202

OTHER PUBLICATIONS

Asaca/Shibasoku Corporation of America DM 200; 1 page; Oct. 7, 2003; http://www.asaca.com/DVL/DM_200.htm.

Colarelli et al.; The Case for Massive Arrays of Idle Disks (MAID); Dept. of Computer Science, Univ. of Colorado, Boulder; Jan. 7, 2002; pp. 1-6.

Patterson et al.; A Case for Redundant Arrays of Inexpensive Disks (RAID); Computer Science Division, Dept. of Electrical Eng. & Computer Sci., UC Bekeley; 1998; pp. 109-116.

Chase et al.; "Managing Energy and Server Rsources in Hosting Centers"; Dept. of Computer Science, Duke University; Oct. 2001; pp. 1-14.

* cited by examiner

| MDV attribute data (membership, state, shelf identifier) |
|---|
| Disk attribute data (vendor, serial number, state, RAIDset membership) |
| RAIDset attribute data (RAIDset UUID, state, RAIDset membership, capacity, Volume UUID) |
| Volume attribute data (Volume UUID, state, rights, owners, capacity, RAIDset UUID) |
| Volume 0 (Volume UUID, WRITE cache, READ cache, bad block table) |
| Volume 1 (Volume UUID, WRITE cache, READ cache, bad block table) |
| • • • |
| Volume n (Volume UUID, WRITE cache, READ cache, bad block table) |

Fig. 7

METHOD AND SYSTEM FOR ACCESSING AUXILIARY DATA IN POWER-EFFICIENT HIGH-CAPACITY SCALABLE STORAGE SYSTEM

CROSS-REFERENCE TO RELATED APPLICATION

This application is a continuation-in-part of the following U.S. application Ser. No. 10/607,932 filed Jun. 26, 2003 which is hereby incorporated by reference, as if it is set forth in full in this specification:

U.S. Pat. No. 7,035,972, entitled 'Method and Apparatus for Power-Efficient High-Capacity Scalable Storage System', issued on Apr. 25, 2006.

BACKGROUND OF THE INVENTION

Field of the Invention

The present invention relates generally to data storage systems and more particularly to accessing auxiliary data in power-efficient, high-capacity data storage systems.

Data storage systems for computing applications include storage devices such as hard disk drives, floppy drives, tape drives, and compact disks. An increase in the amount and complexity of these applications has resulted in a proportional increase in the demand for larger storage capacities. Consequently, the production of high-capacity storage devices has increased. However, large storage capacities demand reliable storage devices with reasonably high data-transfer rates. Moreover, the storage capacity of a single storage device cannot be increased beyond a certain limit. Therefore, various data-storage system configurations and topologies, using multiple storage devices, are commonly used to meet the growing demand for increased storage capacity.

A configuration of the data storage systems, to meet the growing demand, involves the use of multiple disk drives. Such a configuration permits redundancy of stored data. Redundancy ensures data integrity in the case of device failures. In many such data-storage systems, recovery from common failures can be automated within the data storage system by using data redundancy such as parity and its generation, with the help of a central controller. One such data-storage system is typically referred to as Massive Array of Idle/Independent Disks (MAID).

However, MAID storage systems suffer from inherent drawbacks that increase the data access time from these systems. In a MAID system, the storage devices are powered on only when they are needed. Since, only a partial number of disk drives are powered on at a time, time is required to access the disk drives that are presently powered off. This is because the disk drives that are powered off need to be powered on, which increases data access time of a first read/write request to the disk drives.

SUMMARY OF THE INVENTION

In accordance with one embodiment of the present invention, a method for preparing data units for access in a data storage system is provided. The data storage system includes a plurality of data storage devices such that all the storage devices are not powered on at the same time. The method includes preparing auxiliary data for a data unit on a storage device that will be powered off during an access request of the data unit, and storing auxiliary data on a plurality of the storage devices so that the auxiliary data is always available on a powered-on storage device, when the data unit is the subject of an access request. Such auxiliary data that is presented as always available and accessible is also referred to as pinned data.

In another embodiment of the present invention, a data storage system is provided. The data storage system includes a plurality of data storage devices and a storage management unit. The plurality of data storage devices includes data units, and not all the data storage devices are powered on at the same time. The storage management unit prepares auxiliary data for a data unit on a storage device that will be powered-off during an access request of the data unit. Further, storage management unit stores the auxiliary data on a plurality of storage devices so that the auxiliary data is always available on a powered-on storage device when the data unit is a subject of an access request.

BRIEF DESCRIPTION OF THE DRAWINGS

Various embodiments of the present invention will hereinafter be described in conjunction with the appended drawings, provided to illustrate and not to limit the present invention, wherein like designations denote like elements, and in which:

FIG. 7 is a diagram illustrating the structure of information stored on a metadata disk in accordance with one embodiment.

Figure 1:
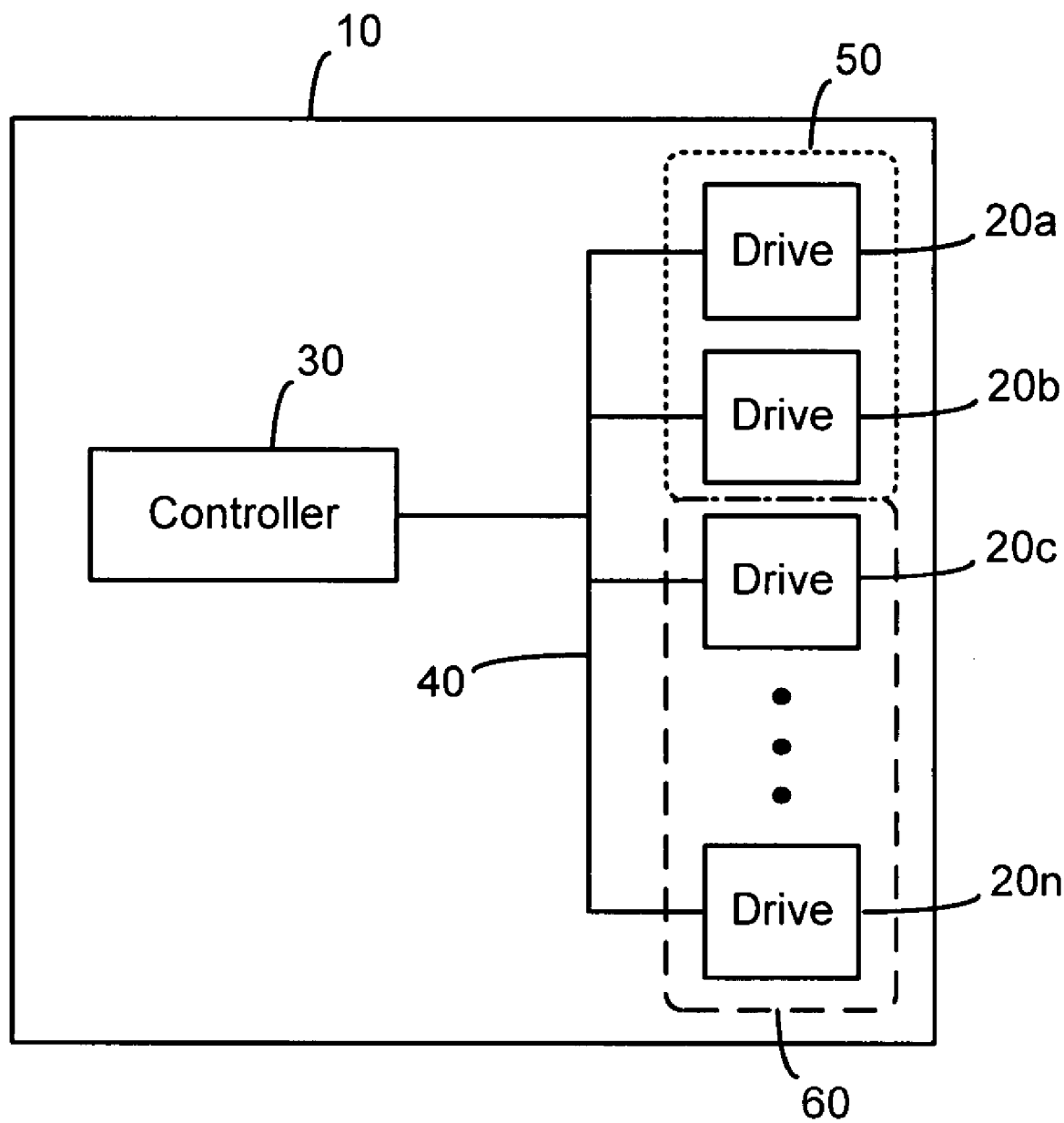
FIG. 1 is a diagram illustrating the general structure of a multiple-disk data storage system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for providing scalable, reliable, power-efficient, high-capacity data storage, wherein large numbers of closely packed data drives having corresponding data storage drives are individually powered on and off, depending upon their usage requirements.

In one embodiment, the invention is implemented in a RAID-type data storage system. This system employs a large number of hard disk drives. When data is written to the system, the data is written to one or more of the disk drives. Metadata and parity information corresponding to the data are also written to one or more of the disk drives to reduce the possibility of data being lost or corrupted. The manner in which data is written to the disks typically involves only one data disk at a time, in addition to metadata and parity disks. Similarly, reads of data typically only involve one data disk at a time. Consequently, data disks which are not currently being accessed can be powered down. The system is therefore configured to individually control the power to each of the disks so that it can power up the subset of disks that are currently being accessed, while powering down the subset of disks that are not being accessed.

Because only a portion of the disk drives in the system are powered on at any given time, the power consumption of the system is less than that of a comparable conventional system (i.e., one with approximately the same total number of similar disk drives) in which all of the disk drives have to be powered on at the same time. As a result of the lower power consumption of the system, it generates less heat and requires less cooling than the conventional system. The present system can therefore be packaged in a smaller enclosure than the comparable conventional system. Another difference between the present system and conventional systems is that conventional systems require switches for routing data to appropriate data disks in accordance with the data protection scheme employed by the system (e.g., RAID level 3). In the present system, on the other hand, most of the disk drives are powered down at any given time, so the data can be distributed by a simple fan-out interconnection, which consumes less power and takes up less volume within the system enclosure than the switches used in conventional systems. Yet another difference between the present system and conventional systems is that, given a particular reliability (e.g., mean time to failure, or MTTF) of the individual disk drives, the present system can be designed to meet a particular reliability level (e.g., threshold mean time between failures, MTBF), as opposed to conventional systems, which are essentially constrained by the number of disk drives in the system and the reliability of the individual disk drives.

The various embodiments of the invention may provide advantages over conventional systems (e.g., RAID systems) in the four areas discussed above: power management; data protection; physical packaging; and storage transaction performance. These advantages are described below with respect to the different areas of impact.

Power Management

In regard to power management, embodiments of the present invention may not only decrease power consumption, but also increase system reliability by optimally power cycling the drives. In other words, only a subset of the total number of drives is powered on at any time. Consequently, the overall system reliability can be designed to be above a certain acceptable threshold.

The power cycling of the drives on an individual basis is one feature that distinguishes the present embodiments from conventional systems. As noted above, prior art multi-drive systems do not allow individual drives, or even sets of drives to be powered off in a deterministic manner during operation of the system to conserve energy. Instead, they teach the powering off of entire systems opportunistically. In other words, if it is expected that the system will not be used at all, the entire system can be powered down. During the period in which the system is powered off, of course, it is not available for use. By powering off individual drives while other drives in the system remain powered on, embodiments of the present invention provide power-efficient systems for data storage and enable such features as the use of closely packed drives to achieve higher drive density than conventional systems in the same footprint.

Data Protection

In regard to data protection, it is desirable to provide a data protection scheme that assures efficiency in storage overhead used while allowing failed disks to be replaced without significant disruption during replacement. This scheme must be optimized with respect to the power cycling of drives since RAID schemes will have to work with the correct subset of drives that are powered on at any time. Thus, any Read or Write operations must be completed in expected time even when a fixed set of drives are powered on. Because embodiments of the present invention employ a data protection scheme that does not use most or all of the data disks simultaneously, the drives that are powered off can be easily replaced without significantly disrupting operations.

Physical Packaging

In regard to the physical packaging of the system, most storage devices must conform to a specific volumetric constraint. For example, there are dimensional and weight limits that correspond to a standard rack, and many customers may have to use systems that fall within these limits. The embodiments of the present invention use high density packing and interconnection of drives to optimize the physical organization of the drives and achieve the largest number of drives possible within these constraints.

Storage Transaction Performance

In regard to storage transaction performance, the power cycling of drives results in a limited number of drives being powered on at any time. This affects performance in two areas. First, the total I/O is bound by the number of powered drives. Second, a random Read operation to a block in a powered down drive would incur a very large penalty in the spin-up time. The embodiments of the present invention use large numbers of individual drives, so that the number of drives that are powered on, even though it will be only a fraction of the total number of drives, will allow the total I/O to be within specification. In regard to the spin-up delay, the data access scheme masks the delay so that the host system does not perceive the delay or experience a degradation in performance.

Figure 2A:
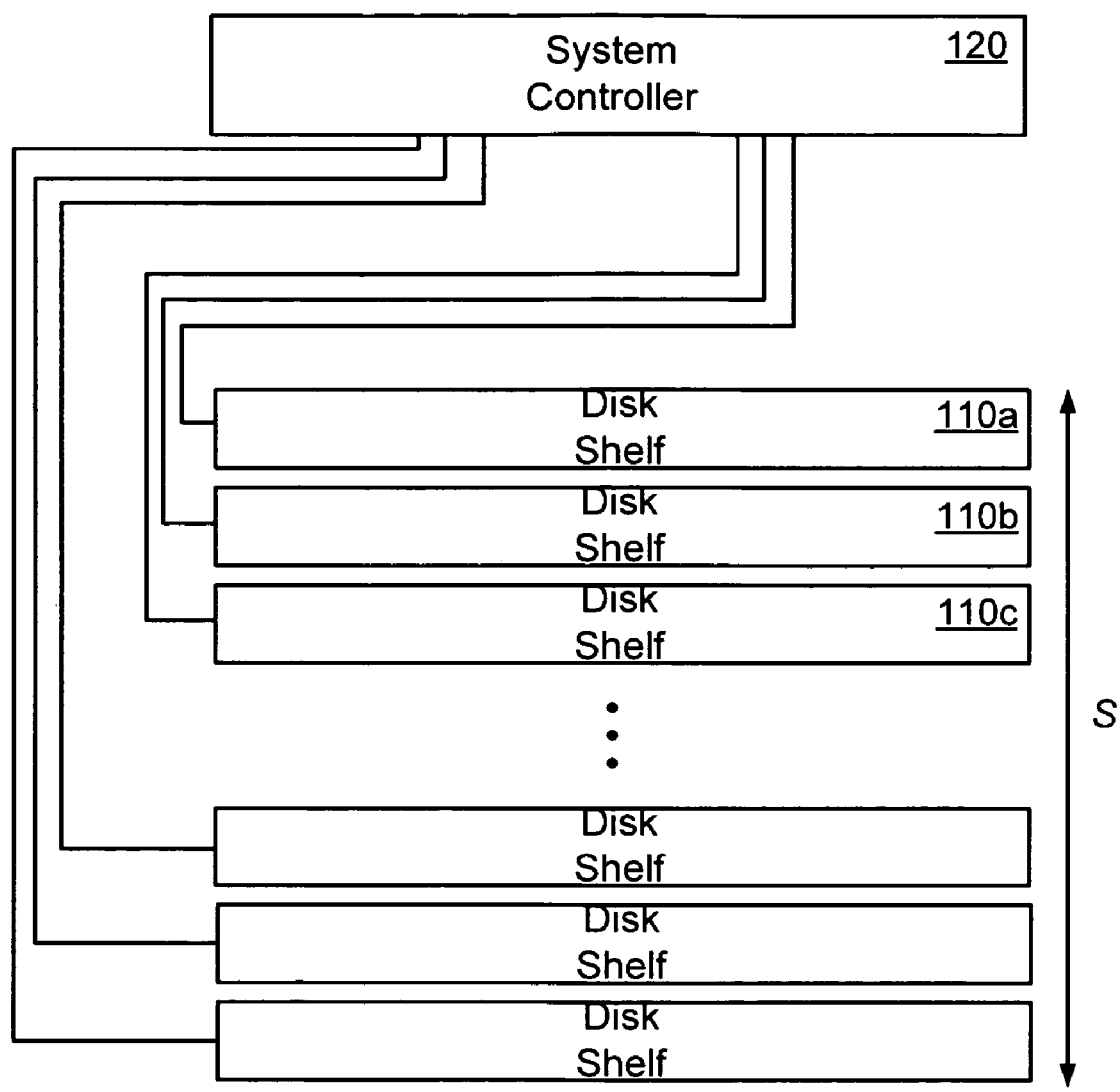
FIGS. 2A and 2B are diagrams illustrating the interconnections between the controllers and disk drives in a densely packed data storage system in accordance with one embodiment.
Figure 2B:
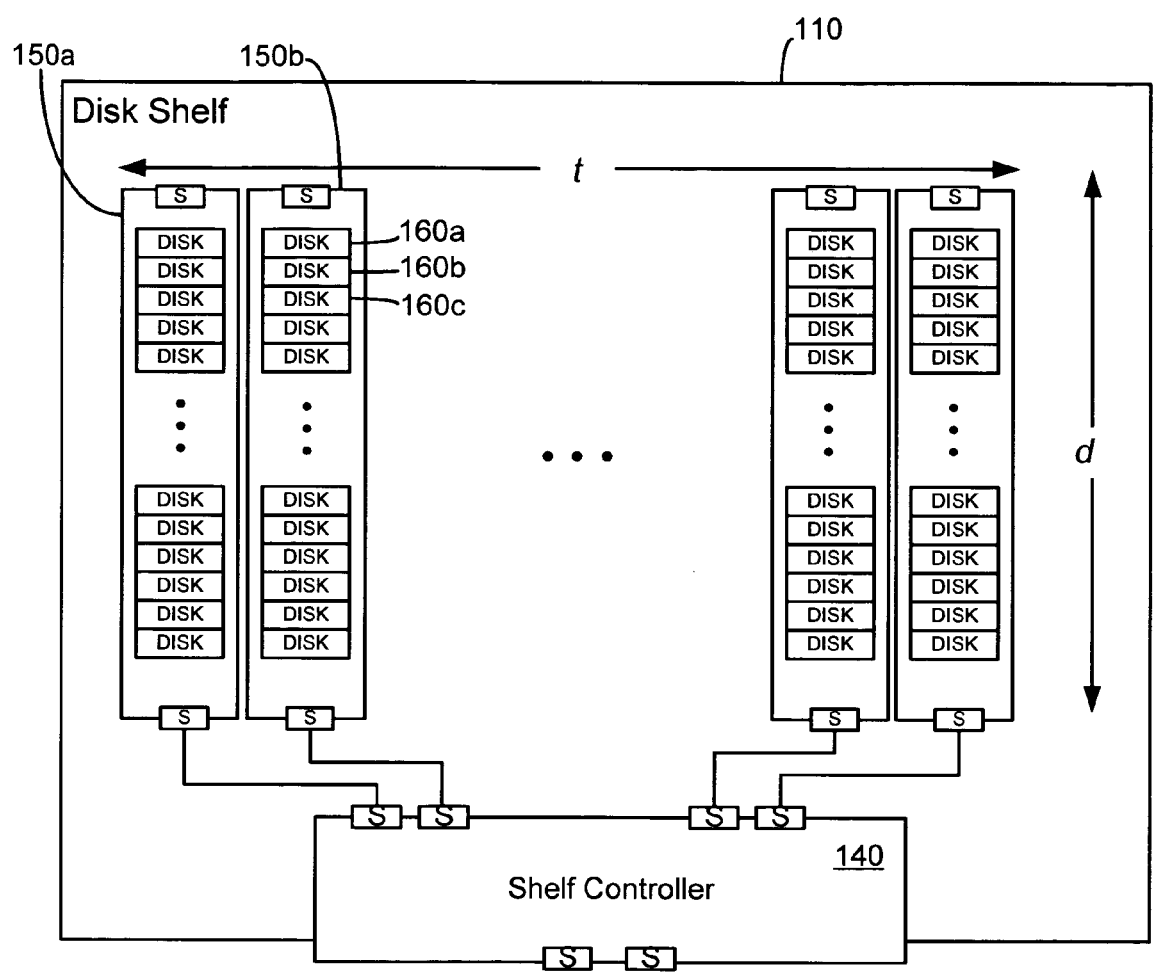

Referring to FIG. 1, a diagram illustrating the general structure of a multiple-disk data storage system in accordance with one embodiment of the invention is shown. It should be noted that the system illustrated in FIG. 1 is a very simplified structure which is intended merely to illustrate one aspect (power cycling) of an embodiment of the invention. A more detailed representation of a preferred embodiment is illustrated in FIG. 2 and the accompanying text below.

As depicted in FIG. 1, data storage system 10 includes multiple disk drives 20. It should be noted that, for the purposes of this disclosure, identical items in the figures may be indicated by identical reference numerals followed by a lowercase letter, e.g., 20a, 20b, and so on. The items may be collectively referred to herein simply by the reference numeral. Each of disk drives 20 is connected to a controller 30 via interconnect 40.

It can be seen in FIG. 1 that disk drives 20 are grouped into two subsets, 50 and 60. Subset 50 and subset 60 differ in that the disk drives in one of the subsets (e.g., 50) are powered on, while the disk drives in the other subset (e.g., 60) are powered down. The individual disk drives in the system are powered on (or powered up) only when needed. When they are not needed, they are powered off (powered down). Thus, the particular disk drives that make up each subset will change as required to enable data accesses (reads and writes) by one or more users. This is distinctive because, as noted above, conventional data storage (e.g., RAID) systems only provide power cycling of the entire set of disk drives—they do not allow the individual disk drives in the system to be powered up and down as needed.

As mentioned above, the system illustrated by FIG. 1 is used here simply to introduce the power cycling aspect of one embodiment of the invention. This and other embodiments described herein are exemplary and numerous variations on these embodiments may be possible. For example, while the embodiment of FIG. 1 utilizes multiple disk drives, other types of data storage, such as solid state memories, optical drives, or the like could also be used. It is also possible to use mixed media drives, although it is contemplated that this will not often be practical. References herein to disk drives or data storage drives should therefore be construed broadly to cover any type of data storage. Similarly, while the embodiment of FIG. 1 has two subsets of disk drives, one of which is powered on and one of which is powered off, other power states may also be possible. For instance, there may be various additional states of operation (e.g., standby) in which the disk drives may exist, each state having its own power consumption characteristics.

The powering of only a subset of the disk drives in the system enables the use of a greater number of drives within the same footprint as a system in which all of the drives are powered on at once. One embodiment of the invention therefore provides high density packing and interconnection of the disk drives. This system comprises a rack having multiple shelves, wherein each shelf contains multiple rows, or "sticks" of disk drives. The structure of this system is illustrated in FIG. 2

Referring to FIG. 2, the top level interconnection between the system controller 120 and the shelves 110 is shown on the left side of the figure. The shelf-level interconnection to each of the sticks 150 of disk drives 160 is shown on the right side of the figure. As shown on the left side of the figure, the system has multiple shelves 110, each of which is connected to a system controller 120. Each shelf has a shelf controller 140 which is connected to the sticks 150 in the shelf. Each stick 150 is likewise connected to each of the disk drives 160 so that they can be individually controlled, both in terms of the data accesses to the disk drives and the powering on/off of the disk drives. The mechanism for determining the optimal packing and interconnection configuration of the drives in the system is described below.

It should be noted that, for the sake of clarity, not all of the identical items in FIG. 2 are individually identified by reference numbers. For example, only a few of the disk shelves (110a-110c), sticks (150a-150b) and disk drives (160a-160c) are numbered. This is not intended to distinguish the items having reference numbers from the identical items that do not have reference numbers.

Let the number of drives in the system be N, where N is a large number.

N is then decomposed into a 3-tuple, such that N=s.t.d where s: number of shelf units in the system, typically determined by the physical height of the system. For example, for a 44U standard rack system, s can be chosen to be 8.

t: the number of "sticks" in the each shelf unit where a stick comprises a column of disks. For example, in a 24-inch-wide rack, t<=8.

d: the number of disk drives in each stick in a shelf. In a standard rack, d can be 14.

Figure 3:
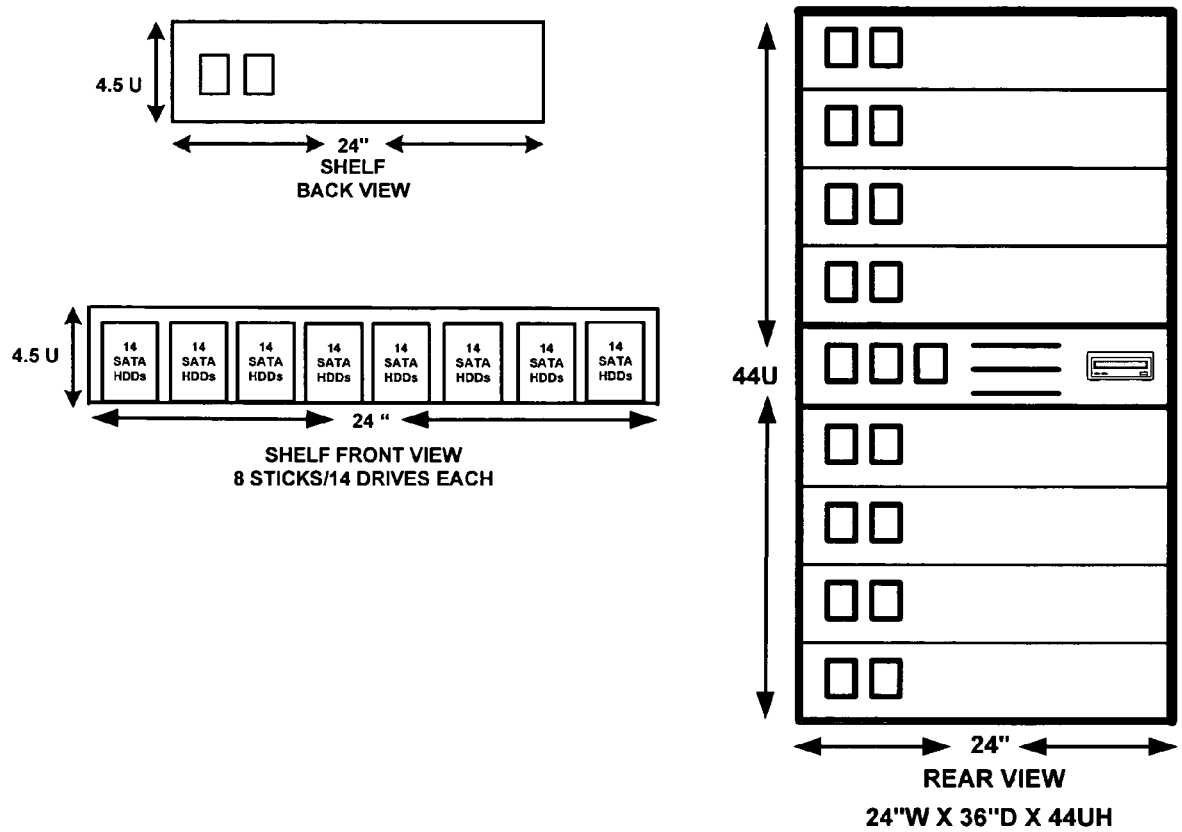
FIG. 3 is a diagram illustrating the physical configuration of a densely packed data storage system in accordance with one embodiment.

The configuration as shown in FIG. 2 is decomposed into shelves, sticks and disks so that the best close packing of disks can be achieved for purposes of maximum volumetric capacity of disk drives. One example of this is shown in FIG. 3. With the large racks that are available, nearly 1000 3.5" disks can be packed into the rack.

The preferred configuration is determined by the decomposition of N into s, t and d while optimizing with respect to the i) volume constraints of the drives and the overall system (the rack), and ii) the weight constraint of the complete system. The latter constraints are imposed by the physical size and weight limits of standard rack sizes in data centers.

Besides constraints on weight and dimensions, large-scale packing of drives must also provide adequate airflow and heat dissipation to enable the disks to operate below a specified ambient temperature. This thermal dissipation limit also affects how the disks are arranged within the system.

One specific implementation that maximizes the density of drives while providing sufficient air flow for heat dissipation is the configuration shown in FIG. 3.

Power Cycling of Drives to Increase System Reliability and Serviceability

One embodiment of the invention comprises a bulk storage or near-online (NOL) system. This storage system is a rack-level disk system comprising multiple shelves. Hosts can connect to the storage system via Fibre Channel ports on the system level rack controller, which interconnects to the shelves in the rack. Each shelf has a local controller that controls all of the drives in the shelf. RAID functionality is supported within each shelf with enough drives for providing redundancy for parity protection as well as disk spares for replacing failed drives.

In this embodiment, the system is power cycled. More particularly, the individual drives are powered on or off to improve the system reliability over the entire (large) set of drives. Given current known annualized failure rates (AFRs), a set of 1000 ATA drives would be expected to have a MTBF of about 20 days. In an enterprise environment, a drive replacement period of 20 days to service the storage system is not acceptable. The present scheme for power cycling the individual drives effectively extends the real life of the drives significantly. However, such power cycling requires significant optimization for a number of reasons. For example, power cycling results in many contact start-stops (CSSs), and increasing CSSs reduces the total life of the drive. Also, having fewer powered drives makes it difficult to spread data across a large RAID set. Consequently, it may be difficult to implement data protection at a level equivalent to RAID 5. Still further, the effective system bandwidth is reduced when there are few powered drives.

In one embodiment, the approach for determining the power cycling parameters is as shown in the flow diagram of FIG. 4 and as described below. It should be noted that the following description assumes that the disk drives have an exponential failure rate (i.e., the probability of failure is $1-e^{-\lambda t}$, where $\lambda$ is the inverse of the failure rate). The failure rates of disk drives (or other types of drives) in other embodiments may have failure rates that are more closely approximated by other mathematical functions. For such systems, the calculations described below would use the alternative failure function instead of the present exponential function.

With a large number of drives, N, that are closely packed into a single physical system, the MTTF of the system will grow significantly as N grows to large numbers.

If the MTTF of a single drive is f (typically in hours) where f=1/(failure rate of a drive) then the system MTBF, F, between failures of individual disks in the system is $$F = \frac{1}{\left(1-\left(1-\frac{1}{f}\right)^N\right)}$$

For N=1000, and f=500,000 hrs or 57 years, F=22 days. Such low MTBF is not acceptable for most data centers and enterprises. As mentioned above, the system MTBF can be increased by powering the drives on and off, i.e., power cycling the drives, to increase the overall life of each drives in the system. This facilitates maintenance of the system, since serviceability of computing systems in the enterprise requires deterministic and scheduled service times when components (drives) can be repaired or replaced. Since it is desired to have scheduled service at regular intervals, this constraint is incorporated into the calculations that follow.

Let the interval to service the system to replace failed disk drives be T, and required the power cycling duty ratio be R.

The effective system MTBF is T, and the effective failure rate of the system is 1/T.

Then, the effective MTBF in a system of N disks is:

$$f^* = \frac{1}{\left\{1-\left(1-\frac{1}{T}\right)^N\right\}}$$

Thus, we can compute the effective MTTF of disks in a large number of drives in a single system so that the service interval is T.

Since the actual MTTF is f, the approach we take is to power cycle the drives, i.e., turn off the drives for a length of time and then turn them on for a certain length of time.

If R is the duty ratio to meet the effective MTTF, then $$R = \frac{f}{f^*} < 1$$

Thus, if the ON period of the drives is p hours, then the drives must be OFF for p/R hours.

Further, since at any one time only a subset of all drives are powered on, the effective number of drives in the system that are powered ON is R*N.

Thus, the ratio R of all drives at a shelf is also the number of drives that must be powered ON in total in each shelf. This also limits the number of drives that are used for data writing or reading as well as any other drives used for holding metadata.

There is one other constraint that must be satisfied in the power cycling that determines the ON period of p hours.

If the typical life of the drive is f hours (same as nominal MTTF), then the number of power cycling events for a drive is CSS (for contact start stops)

$$CSS = \frac{f}{p + \frac{p}{R}}$$

Since CSS is limited to a maximum CSSmax, for any drive

CSS<CSSmax

Thus, p must be chosen such that CSSmax is never exceeded.

Figure 4:
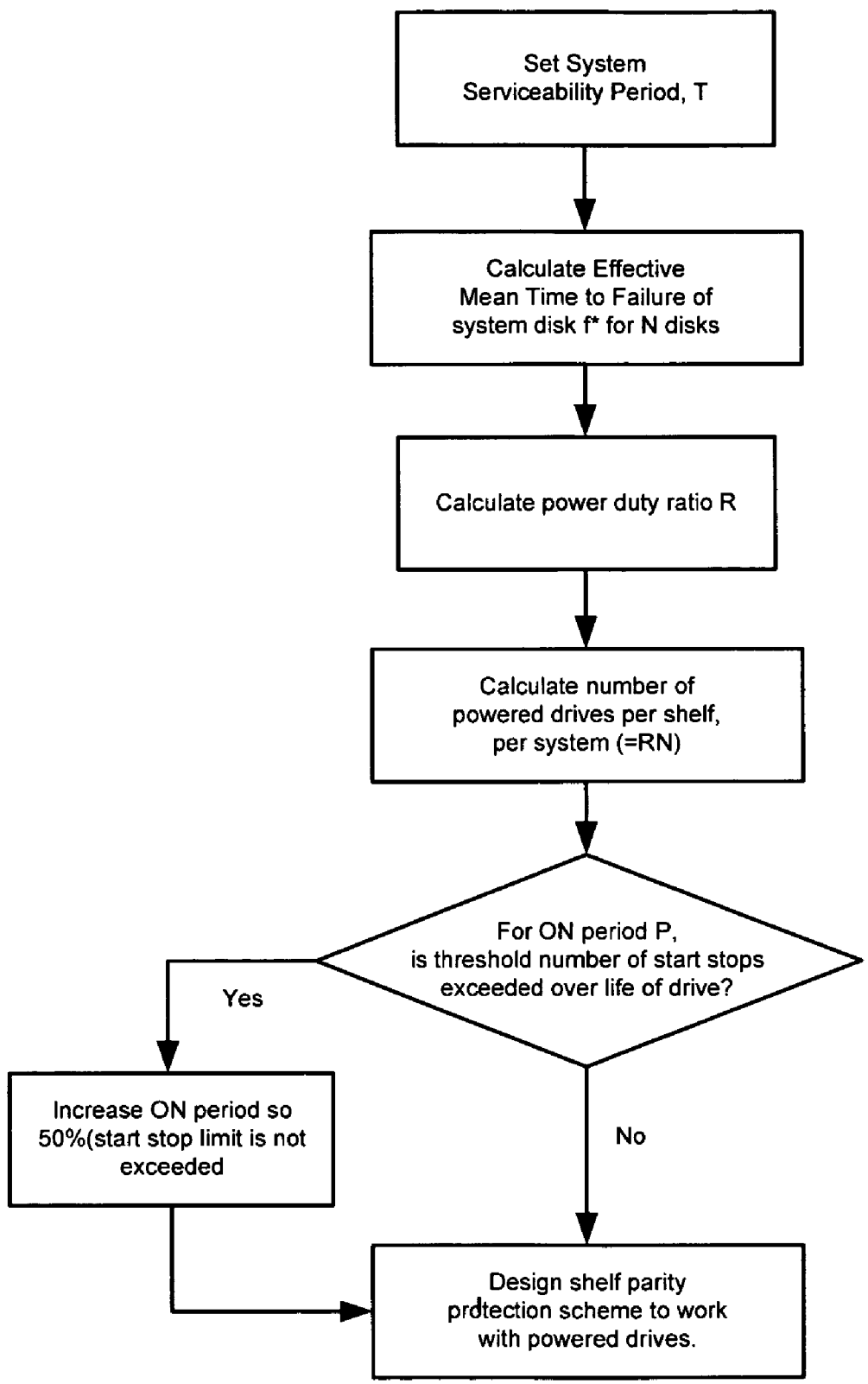
FIG. 4 is a flow diagram illustrating the manner in which the power management scheme of a densely packed data storage system is determined in accordance with one embodiment.

FIG. 4 depicts the flowchart for establishing power cycling parameters.

Efficient Data Protection Scheme for Near Online (NOL) System

In one embodiment, a new RAID variant is implemented in order to meet the needs of the present Power Managed system. To meet the serviceability requirement of the system, the power duty cycle R of the drives will be less than 100% and may be well below 50%. Consequently, when a data volume is written to a RAID volume in a shelf, all drives in the RAID set cannot be powered up (ON). The RAID variant disclosed herein is designed to provide the following features.

First, this scheme is designed to provide adequate parity protection. Further, it is designed to ensure that CSS thresholds imposed by serviceability needs are not violated. Further, the RAID striping parameters are designed to meet the needs of the workload patterns, the bandwidth to be supported at the rack level, and access time. The time to access the first byte must also be much better than tape or sequential media. The scheme is also designed to provide parity based data protection and disk sparing with low overhead.

There are a number of problems that have to be addressed in the data protection scheme. For instance, failure of a disk during a write (because of the increased probability of a disk failure due to the large number of drives in the system) can lead to an I/O transaction not being completed. Means to ensure data integrity and avoid loss of data during a write should therefore be designed into the scheme. Further, data protection requires RAID redundancy or parity protection. RAID operations, however, normally require all drives powered ON since data and parity are written on multiple drives. Further, Using RAID protection and disk sparing typically leads to high disk space overhead that potentially reduces effective capacity. Still further, power cycling increases the number of contact start stops (CSSs), so CSS failure rates increase, possibly by 4 times or more.

In one embodiment, there are 3 types of drives in each shelf: data and parity drives that are power cycled per schedule or by read/write activity; spare drives that are used to migrate data in the event of drive failures; and metadata drives that maintain the state and configuration of any given RAID set. A metadata drive contains metadata for all I/O operations and disk drive operational transitions (power up, power down, sparing, etc.). The data that resides on this volume is organized such that it provides information on the data on the set of disk drives, and also caches data that is to be written or read from drives that are not yet powered on. Thus, the metadata volume plays an important role in disk management, I/O performance, and fault tolerance.

The RAID variant used in the present system "serializes" writes to smallest subset of disks in the RAID set, while ensuring that CSS limits are not exceeded and that the write I/O performance does not suffer in access time and data rate.

Approach to RAID Variant

In applying data protection techniques, there are multiple states in which the set of drives and the data can reside. In one embodiment, the following states are used. Initialize— in this state, a volume has been allocated, but no data has been written to the corresponding disks, except for possible file metadata. Normal—in this state, a volume has valid data residing within the corresponding set of disk drives. This includes volumes for which I/O operations have resulted in the transferring of data. Data redundancy—in this state, a volume has been previously degraded and is in the process of restoring data redundancy throughout the volume. Sparing—in this state, a disk drive within a set is replaced.

Assumptions

When developing techniques for data protection, there are tradeoffs that have to be made based on the technique that is selected. Two assumptions are made when considering tradeoffs. The first assumption is that this data storage system is not to achieve or approach the I/O performance of an enterprise online storage system. In other words, the system is not designed for high I/O transactions, but for reliability. The second assumption is that the I/O workload usage for this data storage is typically large sequential writes and medium to large sequential reads.

Set of Disk Drives Initialized

An initialized set of disk drives consist of a mapped organization of data in which a single disk drive failure will not result in a loss of data. For this technique, all disk drives are initialized to a value of 0.

Figure 5:
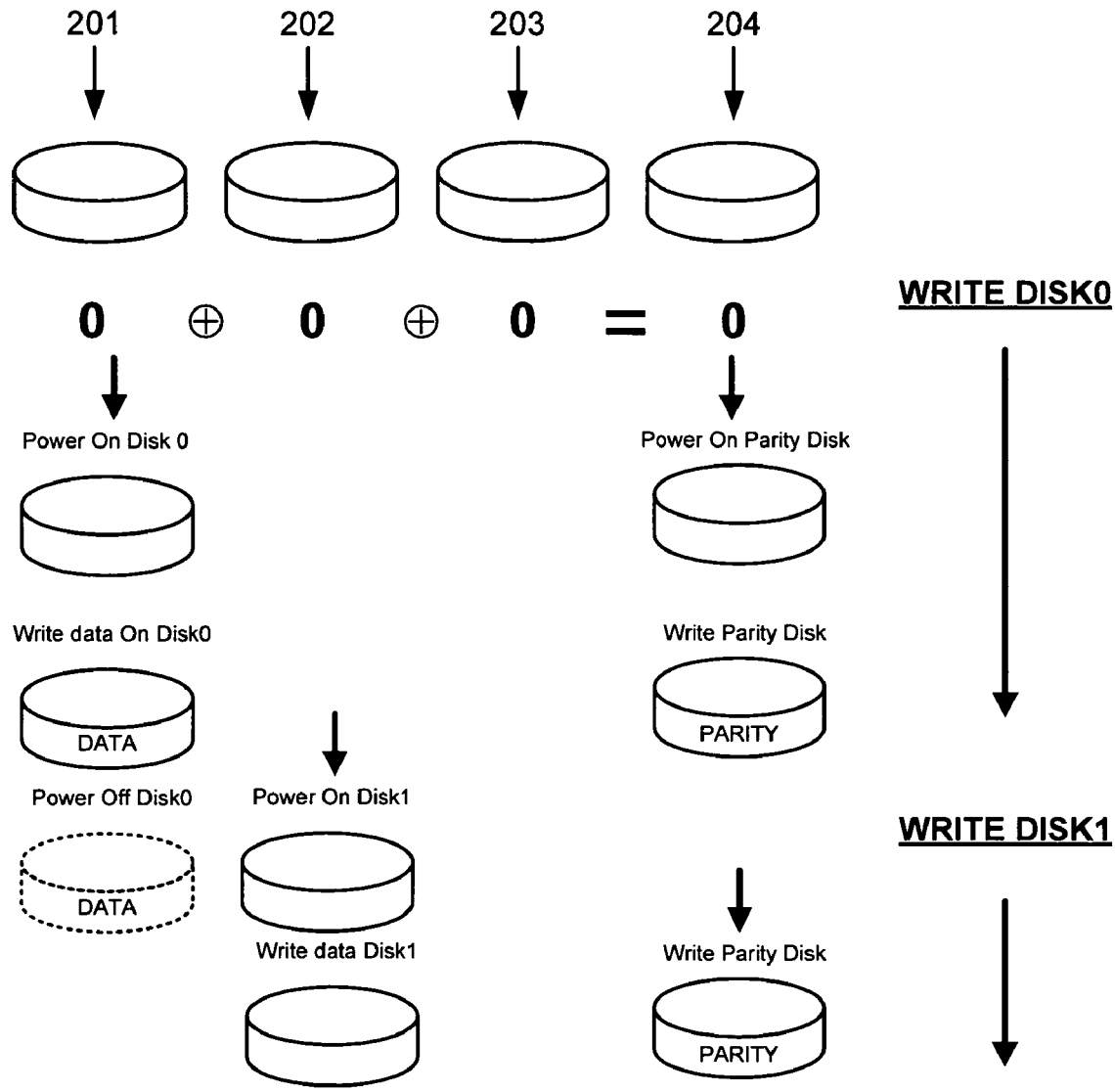
FIG. 5 is a diagram illustrating the manner in which information is written to a parity disk and the manner in which disk drives are powered on and off in accordance with one embodiment.

The presence of "zero-initialized" disk drives is used as the basis for creating a "rolling parity" update. For instance, referring to FIG. 5, in a set of 4 disk drives, 201-204, all drives (3 data and 1 parity) are initialized to "0". (It should be noted that the disk drives are arranged horizontally in the figure—each vertically aligned column represents a single disk at different points in time.) The result of the XOR computation denotes the result of the content of the parity drive ($0 \oplus 0 \oplus 0 = 0$). If data having a value of "5" is written to the first disk, 201, then the parity written to parity disk 204 would represent a "5" ($5 \oplus 0 \oplus 0 = 5$). If the next data disk (disk 202) were written with a value of "A", then the parity would be represented as "F" ($5 \oplus A \oplus 0 = F$). It should be noted that, while the parity disk contains a value equal to the XOR'ing of all three data disks, it is not necessary to power on all of the disks to generate the correct parity. Instead, the old parity ("5") is simply XOR'ed with the newly written data ("A") to generate the new parity ("F"). Thus, it is not necessary to XOR out the old data on disk 202.

Metadata Volume

In order to maintain the state and configuration of a given RAID set in one embodiment, there exists a "metadata volume" (MDV). This volume is a set of online, operational disk drives which may be mirrored for fault tolerance. This volume resides within the same domain as the set of disk drives. Thus, the operating environment should provide enough power, cooling, and packaging to support this volume. This volume contains metadata that is used for I/O operations and disk drive operational transitions (power up, power down, sparing, etc.). The data that resides on this volume is organized such that copies of subsets of data representing the data on the set of disk drives.

Figure 6:
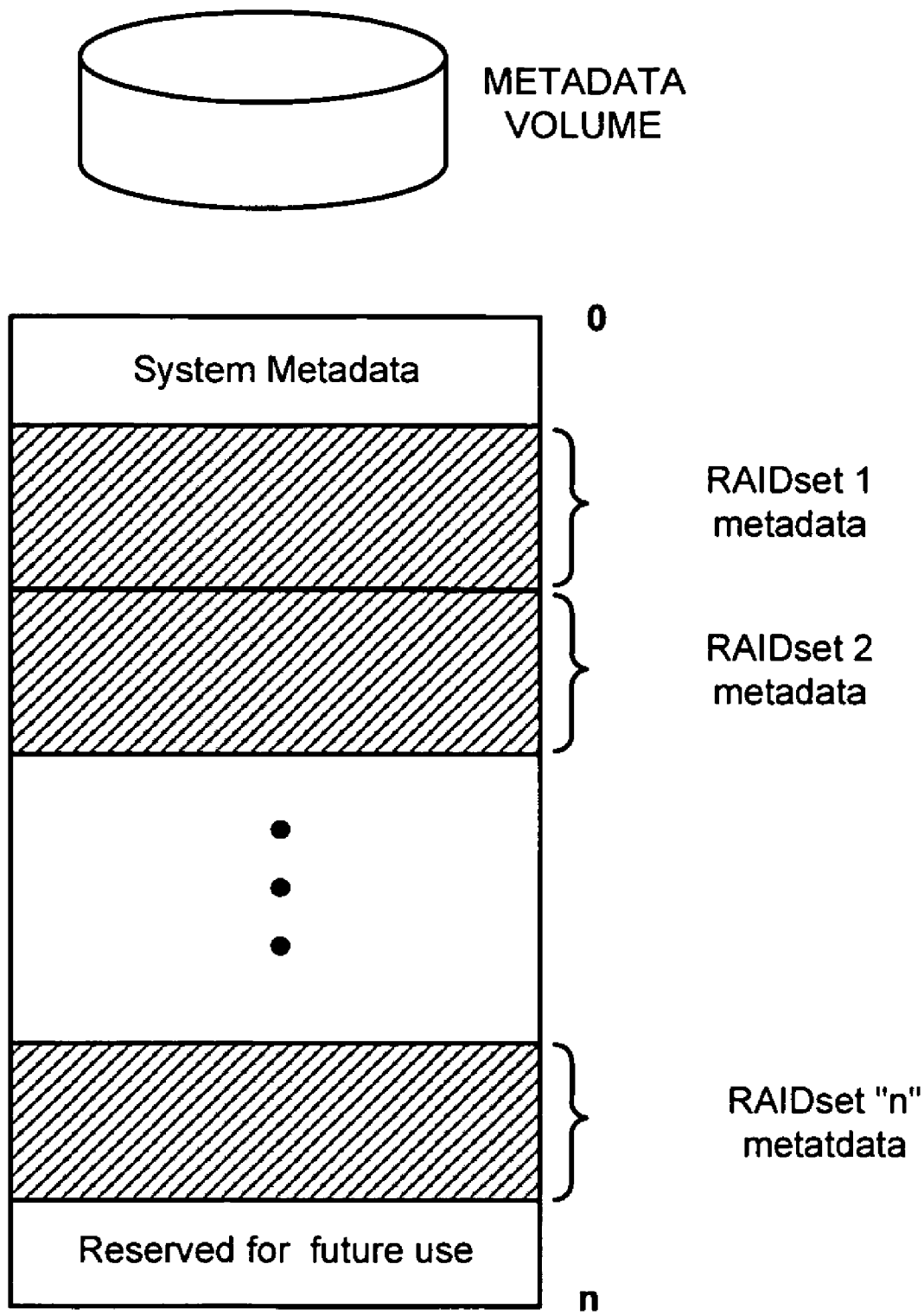
FIG. 6 is a diagram illustrating the content of a metadata disk in accordance with one embodiment.

In a preferred implementation, a metadata volume is located within each shelf corresponding to metadata for all data volumes resident on the disks in the shelf. Referring to FIGS. 6 and 7, the data content of a metadata volume is illustrated. This volume contains all the metadata for the shelf, RAID, disk and enclosure. There also exists metadata for the rack controller. This metadata is used to determine the correct system configuration between the rack controller and disk shelf.

In one embodiment, the metadata volume contains shelf attributes, such as the number of total drives, drive spares, unused data, RAID set attributes and memberships, such as the RAID set set, drive attributes, such as the serial number, hardware revisions, firmware revisions, and volume cache, including read cache and write cache.

Volume Configurations

In one embodiment, the metadata volume is a set of mirrored disk drives. The minimum number of the mirrored drives in this embodiment is 2. The number of disk drives in the metadata volume can be configured to match the level of protection requested by the user. The number of disks cannot exceed the number of disk controllers. In order to provide the highest level of fault tolerance within a disk shelf, the metadata volume is mirrored across each disk controller. This eliminates the possibility of a single disk controller disabling the Shelf Controller.

In order to provide the best performance of a metadata volume, dynamic re-configuration is enabled to determine the best disk controllers for which to have the disk drives operational. Also, in the event of a metadata volume disk failure, the first unallocated disk drive within a disk shelf will be used. Thus if there are no more unallocated disk drives, the first allocated spare disk drive will be used. If there are no more disk drives available, the shelf controller will remain in a stalled state until the metadata volume has been addressed.

Volume Layout

The layout of the metadata volume is designed to provide persistent data and state of the disk shelf. This data is used for shelf configuring, RAID set configuring, volume configuring, and disk configuring. This persistent metadata is updated and utilized during all phases of the disk shelf (Initialization, Normal, Reconstructing, Service, etc.).

The metadata volume data is used to communicate status and configuration data to the rack controller. For instance, the metadata may include "health information for each disk drive (i.e., information on how long the disk drive has been in service, how many times it has been powered on and off, and other factors that may affect its reliability). If the health information for a particular disk drive indicates that the drive should be replaced, the system may begin copying the data on the disk drive to another drive in case the first drive fails, or it may simply provide a notification that the drive should be replaced at the next normal service interval. The metadata volume data also has designated volume-cache area for each of the volumes. In the event that a volume is offline, the data stored in the metadata volume for the offline volume can be used while the volume comes online. This provides, via a request from the rack controller, a window of 10-12 seconds (or whatever time is necessary to power-on the corresponding drives) during which write data is cached while the drives of the offline volume are being powered up. After the drives are powered up and the volume is online, the cached data is written to the volume.

Shelf Initializations

At power-on/reset of the disk shelf, all data is read from the metadata volume. This data is used to bring the disk shelf to an operational mode. Once the disk shelf has completed the initialization, it will wait for the rack controller to initiate the rack controller initialization process.

Volume Operations

Once the disk shelf is in an operational mode, each volume is synchronized with the metadata volume. Each volume will have its associated set of metadata on the disk drive. This is needed in the event of a disastrous metadata volume failure.

Read Cache Operations

The metadata volume has reserved space for each volume. Within the reserved space of the metadata volume resides an allocated volume read cache (VRC). This read cache is designed to alleviate the spin-up and seek time of a disk drive once initiated with power. The VRC replicates the initial portion of each volume. The size of data replicated in the VRC will depend on the performance desired and the environmental conditions. Therefore, in the event that an I/O READ request is given to an offline volume, the data can be sourced from the VRC. Care must be taken to ensure that this data is coherent and consistent with the associated volume.

Write Cache Operations

As noted above, the metadata volume has reserved space for each volume. Within the reserved space of the metadata volume resides an allocated volume write cache (VWC). This write cached is designed to alleviate the spin-up and seek time of a disk drive once initiated with power. The VWC has a portion of the initial data, e.g., 512 MB, replicated for each volume. Therefore, in the event that an I/O write request is given to an offline volume, the data can be temporarily stored in the VWC. Again, care must be taken to ensure that this data is coherent and consistent with the associated volume.

Set of Disk I/O Operations

Figure 8:
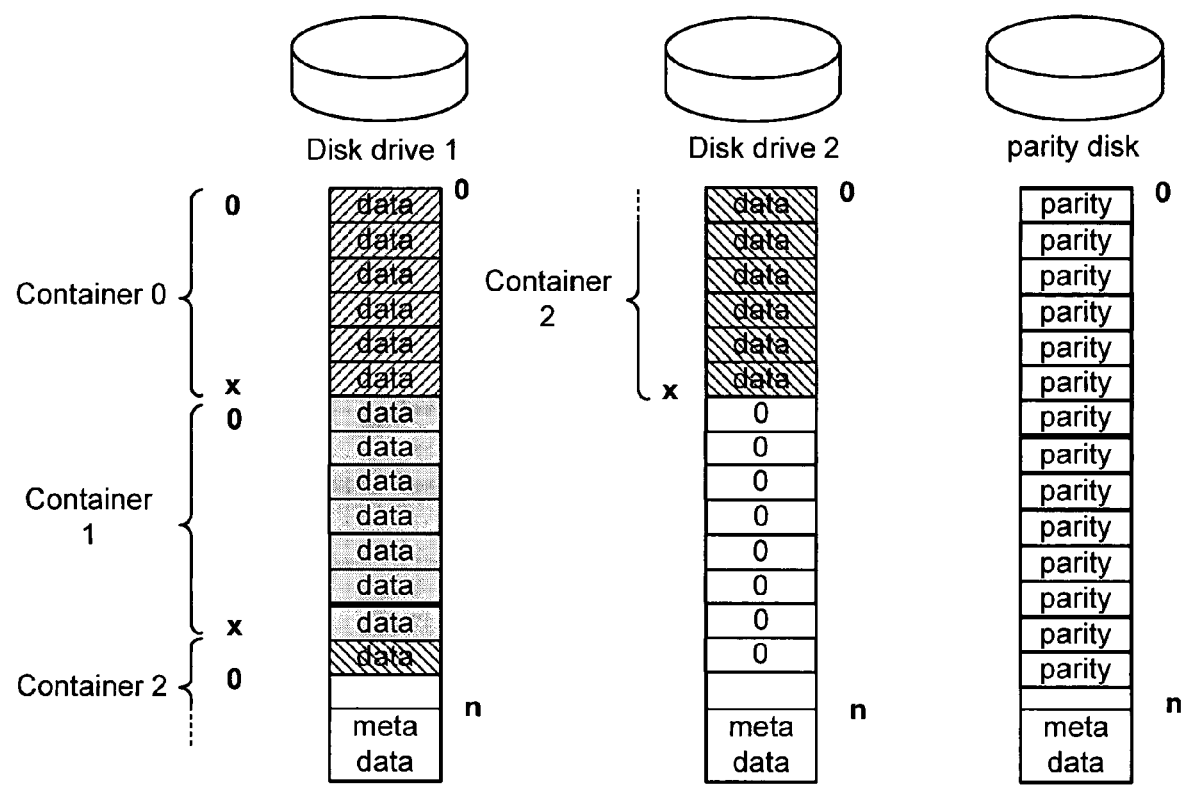
FIG. 8 is a diagram illustrating the manner in which containers of data are arranged on a set of disk drives in accordance with one embodiment.

Referring to FIG. 8, a diagram illustrating the manner in which data is stored on a set of disks is shown. A set of disks are partitioned into "large contiguous" sets of data blocks, known as containers. Single or multiple disk volumes which are presented to the storage user or server can represent a container. The data blocks within a container are dictated by the disk sector size, typically, 512 bytes. Each container is statically allocated and addressed from 0 to x, where x is the number of data blocks minus 1. Each container can then be divided into some number of sub-containers.

The access to each of the containers is through a level of address indirection. The container is a contiguous set of blocks that is addressed from 0 to x. As the device is accessed, the associated disk drive must be powered and operational. As an example, container 0 is fully contained within the address space of disk drive 1. Thus, when container 0 is written or read, the only disk drive that is powered on is disk drive 1.

Figure 9:
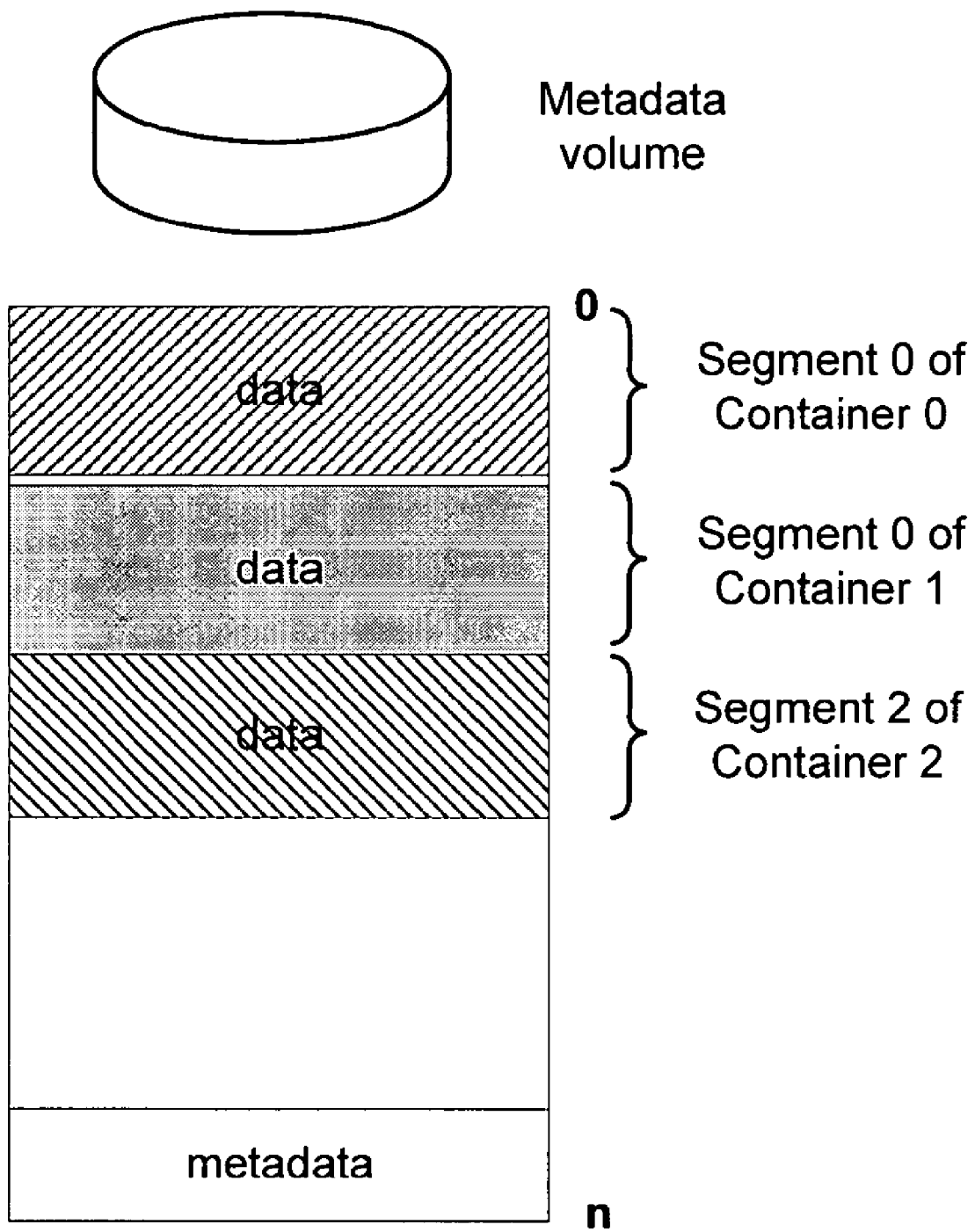
FIG. 9 is a diagram illustrating the manner in which the initial segments of data from a plurality of disk drives are stored on a metadata volume in accordance with one embodiment.

If there is a limited amount of power and cooling capacity for the system and only one disk drive can be accessed at a time, then in order to access container 2, disk drives 1 and 2 must be alternately powered, as container 2 spans both disk drives. Initially, disk drive 1 is powered. Then, disk drive 1 is powered down, and disk drive 2 is powered up. Consequently, there will be a delay for disk drive 2 to become ready for access. Thus, the access of the next set of data blocks on disk drive 2 will be delayed. This generally is not an acceptable behavior for access to a disk drive. The first segment of each disk drive and/or container is therefore cached on a separate set of active/online disk drives. In this embodiment, the data blocks for container 2 reside on the metadata volume, as illustrated in FIG. 9.

This technique, in which a transition between two disk drives is accomplished by powering down one disk drive and powering up the other disk drive, can be applied to more than just a single pair of disk drives. In the event that there is a need for higher bandwidth, the single drives described above can each be representative of a set of disk drives. This disk drive configuration could comprise RAID 10 or some other form of data organization that can spread data over many disk drives (spindles).

Set of Disk Drives becoming Redundant

Figure 10:
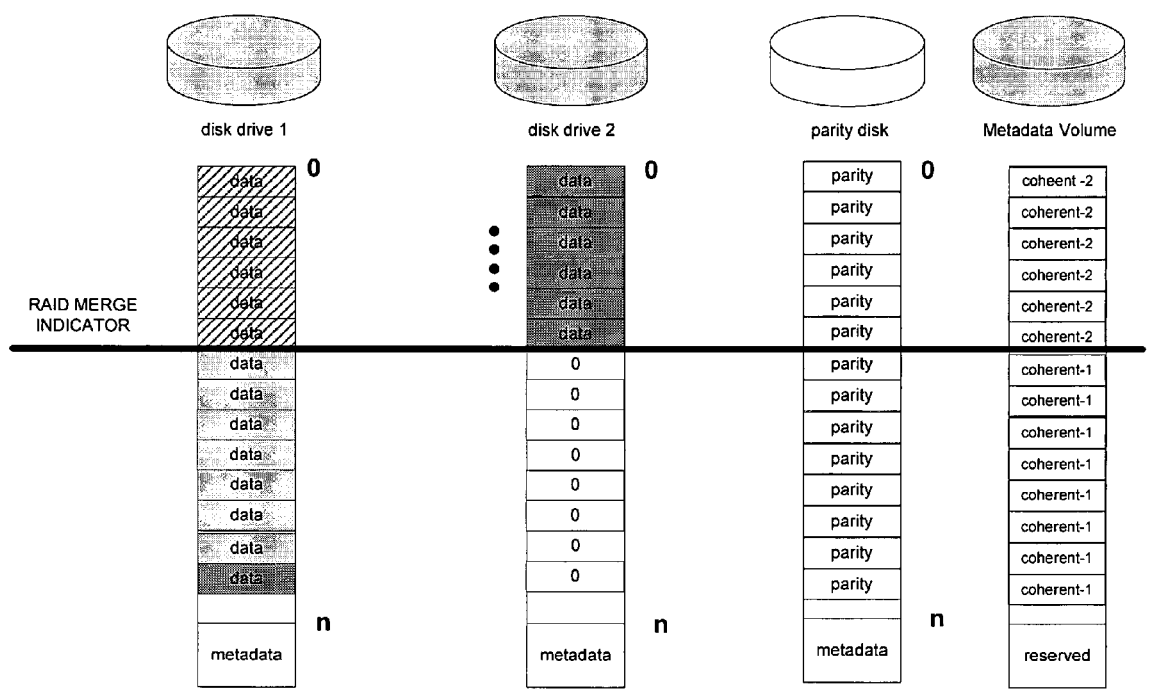
FIG. 10 is a diagram illustrating the use of a pair of redundant disk drives and corresponding parity and metadata volumes in accordance with one embodiment.

Referring to FIG. 10, a diagram illustrating the use of a pair of redundant disk drives is shown. As data is allocated to a set of disk drives, there is a need for data replication. Assuming that the replication is a form of RAID (1, 4, 5, etc.), then the process of merging must keep the data coherent. This process may be done synchronously with each write operation, or it may be performed at a later time. Since not all disk drives are powered on at one time, it is useful to keep track of the current status of a set of disk drives. This housekeeping comprises the information needed to regenerate data blocks, knowing exactly which set of disk drives or subset of disk drives are valid in restoring the data.

Variable RAID Set Membership

One significant benefit of the power-managed system described herein is that drives in a RAID set can be reused, even in the event of multiple disk drive failures. In conventional RAID systems, failure of more than one drive in a RAID set results in the need to abandon all of the drives in the RAID set, since data is striped or distributed across all of the drives in the RAID set. In the case of the power-managed system described herein, it is possible to reuse the remaining drives in a different RAID set or a RAID set of different size. This results in much greater utilization of the storage space in the total system.

In the event of multiple drive failures in the same RAID set, the set of member drives in the RAID set can be decreased (e.g., from six drives to four). Using the property of "zero-based" XOR parity as described above, the parity for the reduced set of drives can be calculated from the data that resides on these drives. This allows the preservation of the data on the remaining drives in the event of future drive failures. In the event that the parity drive is one of the failed drives, a new parity drive could be designated for the newly formed RAID set, and the parity information would be stored on this drive. Disk drive metadata is updated to reflect the remaining and/or new drives that now constitute the reduced or newly formed RAID set.

In one exemplary embodiment, a RAID set has five member drives, including four data drives and one parity drive. In the event of a failure of one data drive, the data can be reconstructed, either on the remaining disk drives if sufficient space is available. (If a spare is available to replace the failed drive and it is not necessary to reduce the RAID set, the data can be reconstructed on the new member drive.) In the event of a simultaneous failure of two or more data drives, the data on the non-failed drives can be retained and operations can proceed with the remaining data on the reduced RAID set, or the reduced RAID set can be re-initialized and used as a new RAID set.

This same principle can be applied to expand a set of disk drives. In other words, if it would be desirable to add a drive to a RAID set (e.g., increasing the set from four drives to five), this can also be accomplished in a manner similar to the reduction of the RAID set. In the event a RAID set would warrant an additional disk drive, the disk drive metadata would need to be updated to represent the membership of the new drive(s).

Sparing of a Set of Disk Drives

The sparing of a failed disk on of a set of disk drives is performed at both failed data block and the failed disk drive events. The sparing of failed data blocks is temporarily regenerated. Using both the metadata volume and a 'spare' disk drive, the process of restoring redundancy within a set of disk drives, can be more efficient and effective. This process is matched to the powering of the each of the remaining disk drives in a set of disk drives.

In the event of an exceeded threshold for failed data blocks, a spare disk drive is allocated as a candidate for replacement into the RAID set. Since only a limited number of drives can be powered-on at one time, only the drive having the failed data blocks and the candidate drive are powered. At this point, only the known good data blocks are copied onto the corresponding address locations of the failed data blocks. Once all the known good blocks have been copied, the process to restore the failed blocks is initiated. Thus the entire RAID set will need to be powered-on. Although the entire set of disk drives needs to be powered-on, it is only for the time necessary to repair the bad blocks. After all the bad blocks have been repaired, the drives are returned to a powered-off state.

In the event of a failed disk drive, all disk drives in the RAID set are powered-on. The reconstruction process, discussed in the previous section, would then be initiated for the restoration of all the data on the failed disk drive.

RAID Automated Storage Management Features

Figure 11:
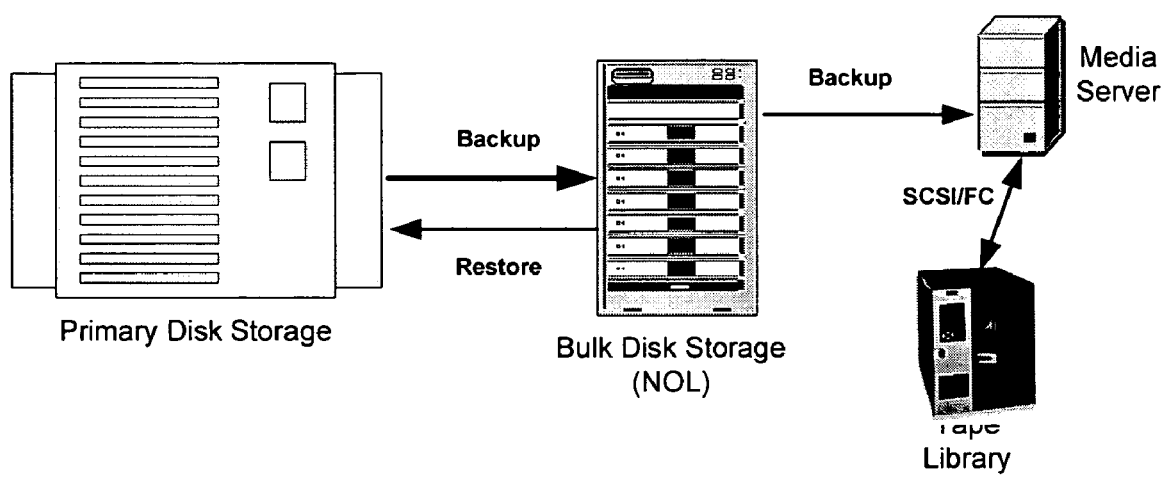
FIG. 11 is a diagram illustrating the use of a data storage system as a backup target for the primary storage via a direct connection and as a media (backup) server to a tape library in accordance with one embodiment.

The end user of the system may use it, for example, as a disk system attached directly to a server as direct attached storage (DAS) or as shared storage in a storage area network (SAN). In FIG. 11, the system is used as the backup target to the primary storage via a direct connection and then connected via a media (backup) server to a tape library. The system may be used in other ways in other embodiments.

In this embodiment, the system presents volume images to the servers or users of the system. However, physical volumes are not directly accessible to the end users. This is because, as described earlier, through the power managed RAID, the system hides the complexity of access to physical drives, whether they are powered on or not. The controller at the rack and the shelf level isolates the logical volume from the physical volume and drives.

Given this presentation of the logical view of the disk volumes, the system can rewrite, relocate or move the logical volumes to different physical locations. This enables a number of volume-level functions that are described below. For instance, the system may provide independence from the disk drive type, capacity, data rates, etc. This allows migration to new media as they become available and when new technology is adopted. It also eliminates the device (disk) management administration required to incorporate technology obsolescence.

The system may also provide automated replication for disaster recovery. The second copy of a primary volume can be independently copied to third party storage devices over the network, either local or over wide-area. Further, the device can be another disk system, another tape system, or the like. Also, the volume could be replicated to multiple sites for simultaneously creating multiple remote or local copies.

The system may also provide automatic incremental backup to conserve media and bandwidth. Incremental and differential changes in the storage volume can be propagated to the third or later copies.

The system may also provide authentication and authorization services. Access to both the physical and logical volumes and drives can be controlled by the rack and shelf controller since it is interposed between the end user of the volumes and the physical drives.

The system may also provide automated data revitalization. Since data on disk media can degrade over time, the system controller can refresh the volume data to different drives automatically so that the data integrity is maintained. Since the controllers have information on when disks and volumes are written, they can keep track of which disk data has to be refreshed or revitalized.

The system may also provide concurrent restores: multiple restores can be conducted concurrently, possibly initiated asynchronously or via policy by the controllers in the system.

The system may also provide unique indexing of metadata within a storage volume: by keeping metadata information on the details of objects contained within a volume, such as within the metadata volume in a shelf. The metadata can be used by the controller for the rapid search of specific objects across volumes in the system.

The system may also provide other storage administration feature for the management of secondary and multiple copies of volumes, such as single-view of all data to simplify and reduce cost of managing all volume copies, automated management of the distribution of the copies of data, and auto-discovery and change detection of the primary volume that is being backed up When the system is used for creating backups.

A Preferred Implementation

Interconnect

Figure 12:
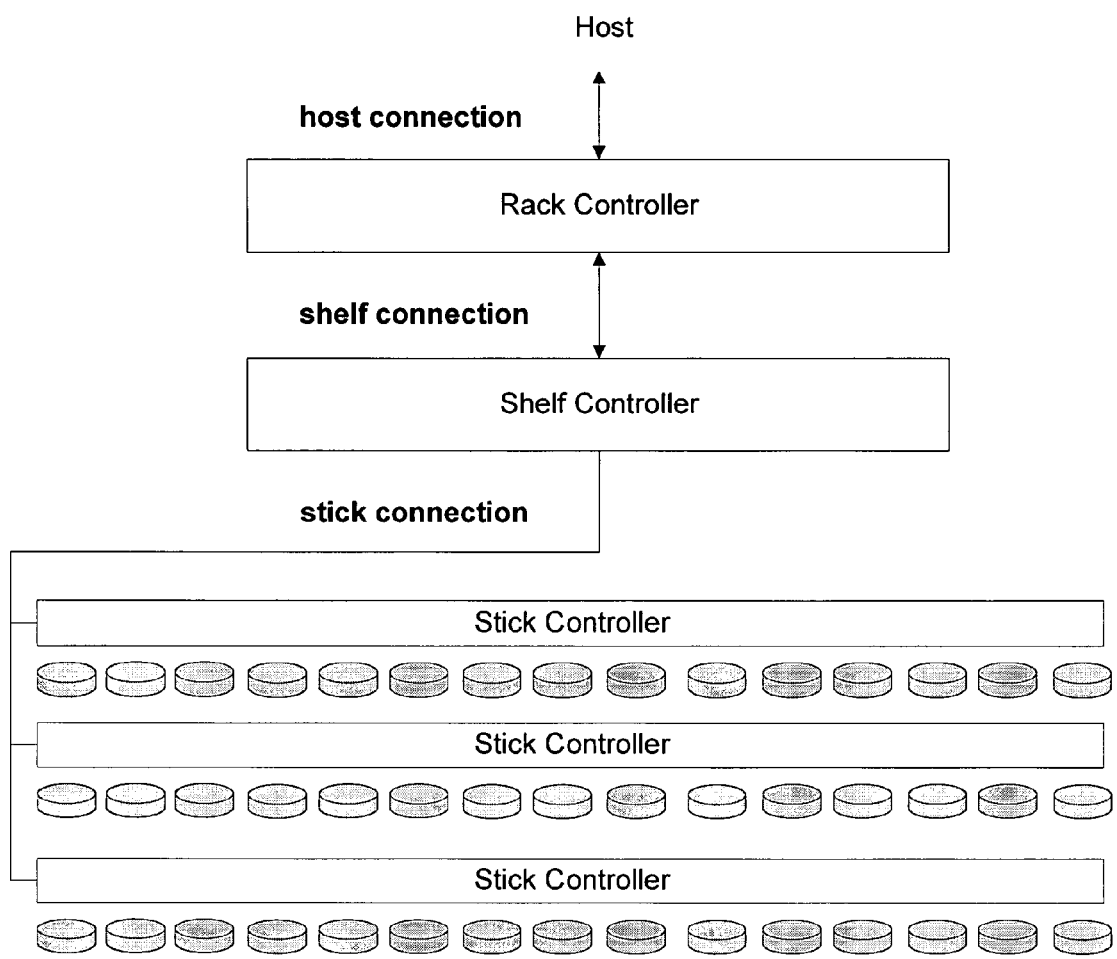
FIG. 12 is a diagram illustrating the interconnect from the host (server or end user) to the end disk drives in accordance with one embodiment.

The preferred interconnect system provides a means to connect 896 disk drives, configured as 112 disks per shelf and 8 shelves per rack. The internal system interconnect is designed to provide an aggregate throughput equivalent to six 2 Gb/sec Fibre Channel interfaces (1000 MB/s read or write). The external system interface is Fibre Channel. The interconnect system is optimized for the lowest cost per disk at the required throughput. FIG. 12 shows the interconnect scheme from the host (server or end user) to the end disk drives.

The interconnect system incorporates RAID at the shelf level to provide data reliability. The RAID controller is designed to address 112 disks, some of which may be allocated to sparing. The RAID controller spans 8 sticks of 14 disks each. The RAID set should be configured to span multiple sticks to guard against loss of any single stick controller or interconnect or loss of any single disk drive.

The system interconnect from shelf to stick can be configured to provide redundancy at the stick level for improved availability.

The stick-level interconnect is composed of a stick controller (Field Programmable Gate Arry/Apparition Specific Integrated Circuit plus SERDES), shelf controller (FPGA/ASIC plus SERDES, external processor and memory), rack controller (FPGA/ASIC plus SERDES) and associated cables, connectors, printed circuit boards, power supplies and miscellaneous components. As an option, the SERDES and/or processor functions may be integrated into an advanced FPGA (e.g., using Xilinx Virtex II Pro).

Shelf and Stick Controller

Figure 13:
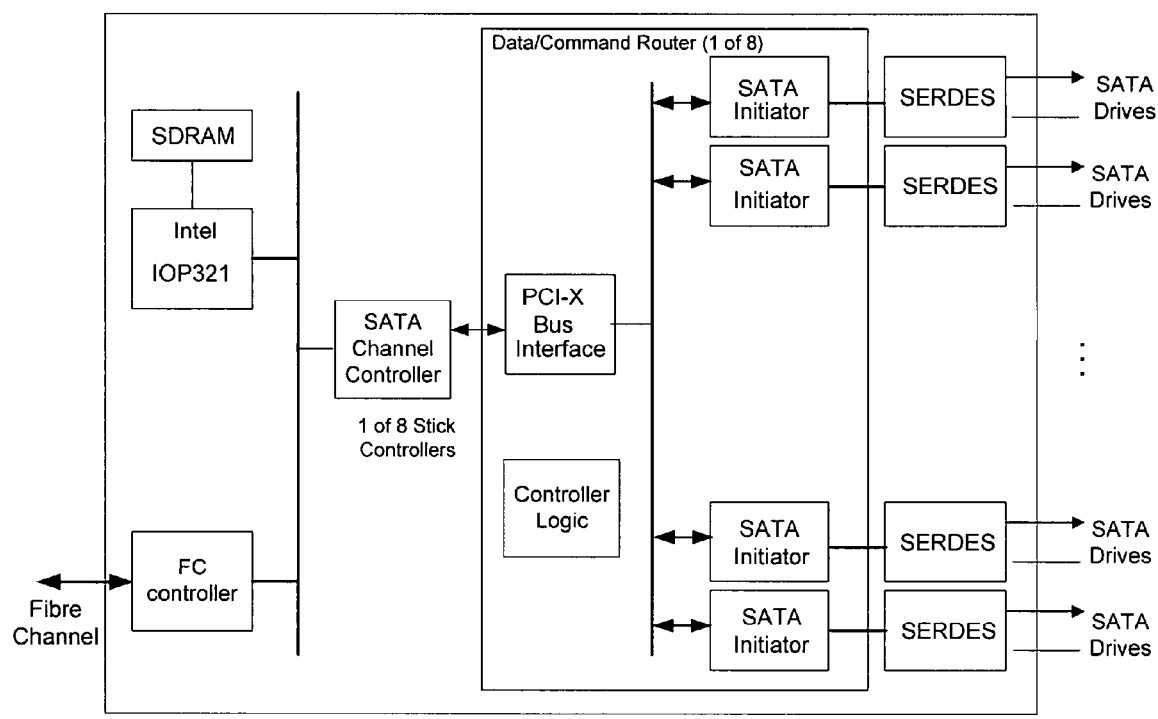
FIG. 13 is a diagram illustrating the interconnection of a channel controller with multiple stick controllers in accordance with one embodiment.
Figure 15:
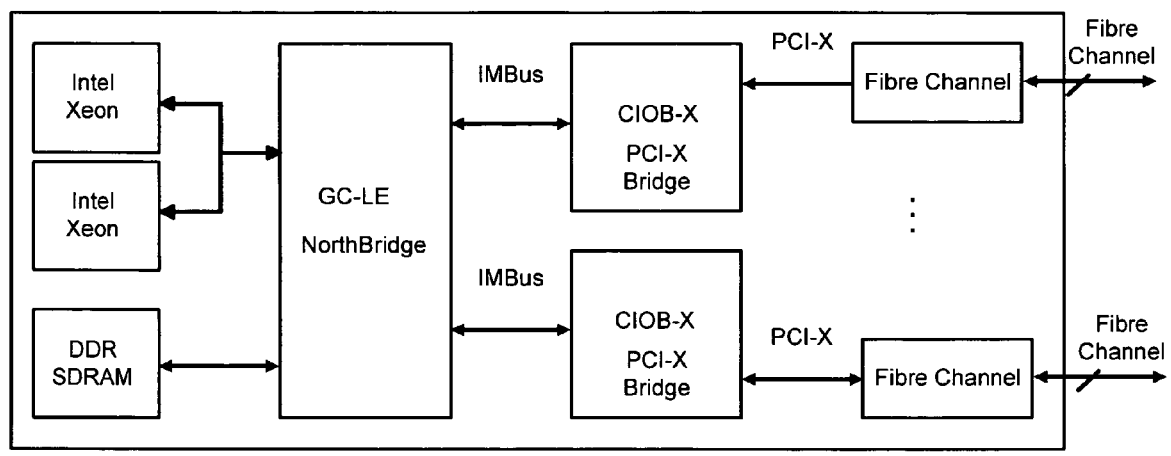
FIG. 15 is a diagram illustrating the implementation of a rack controller in accordance with one embodiment.

The shelf controller and the associated 8 stick controllers are shown in FIG. 13. In this implementation, the shelf controller is connected to the rack controller (FIG. 15) via Fibre Channel interconnects. It should be noted that, in other embodiments, other types of controllers and interconnects (e.g., SCSI) may be used.

The shelf controller can provide different RAID level support such as RAID 0, 1 and 5 and combinations thereof across programmable disk RAID sets accessible via eight SATA initiator ports. The RAID functions are implemented in firmware, with acceleration provided by an XOR engine and DMA engine implemented in hardware. In this case, an XOR-equipped CPU such as Intel IOP321 may be useful. However, the preferred implementation does not use an XOR-equipped CPU and, in general, any controller chip may be used.

Figure 14:
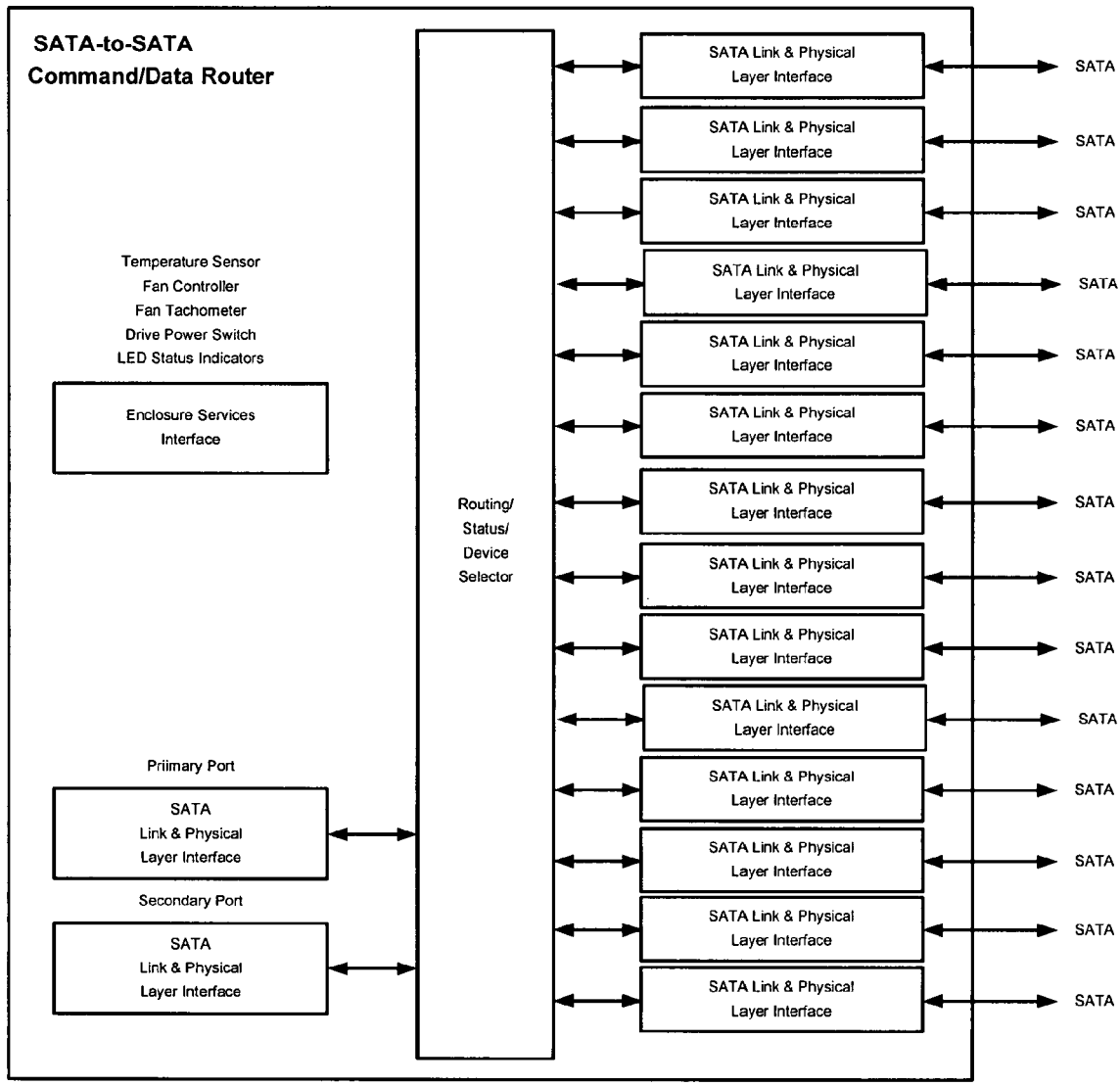
FIG. 14 is a diagram illustrating the interconnection of the outputs of a SATA channel controller with corresponding stick controller data/command router devices in accordance with one embodiment.

The Shelf Controller RAID control unit connects to the Stick Controller via a SATA Channel Controller over the PCI-X bus. The 8 SATA outputs of the SATA Channel Controller each connect with a stick controller data/command router device (FIG. 14). Each data/command router controls 14 SATA drives of each stick.

Rack Controller

The rack controller comprises a motherboard with a ServerWorks GC-LE chipset and four to 8 PCI-X slots. In the implementation shown in FIG. 15, the PCI-X slots are populated with dual-port or quad-port 2G Fibre Channel PCI-X target bus adapters (TBA). In other embodiments, other components, which employ other protocols, may be used. For example, in one embodiment, quad-port shelf SCSI adapters using u320 to the shelf units may be used.

Auxiliary Data Access

Embodiments of the present invention further provide a method, system, and computer program product for preparing data units for access in a power-efficient, high-capacity, data storage system that is scalable and reliable. The data storage system includes multiple storage devices. At times, all the storage devices of the data storage system are not powered on at the same time.

Embodiments of the present invention, described below, pertain to preparing data units in data storage systems, for example, power-managed redundant array of independent/inexpensive disk (RAID) storage systems or massive array of independent/inexpensive disk (MAID) storage systems.

Figure 16:
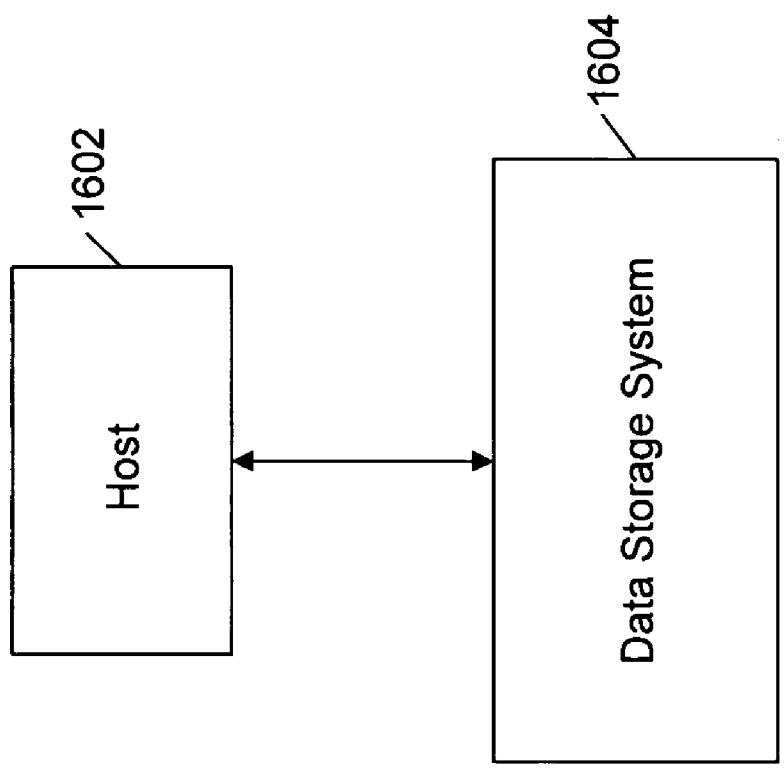
FIG. 16 is a diagram illustrating an interaction of a host with a data storage system, in accordance with one embodiment of the present invention.

FIG. 16 is a block diagram illustrating an interaction of a data storage system 1602 with a host 1604, in accordance with an embodiment of the present invention. Data storage system 1602 receives a request for data access or access request from host 1604. Data storage system 1602 includes multiple storage devices. It should be noted that in FIG. 1, only one host 1604 is shown for the sake of clarity. In general, more than one host can make access requests to data storage system 1602.

Figure 17:
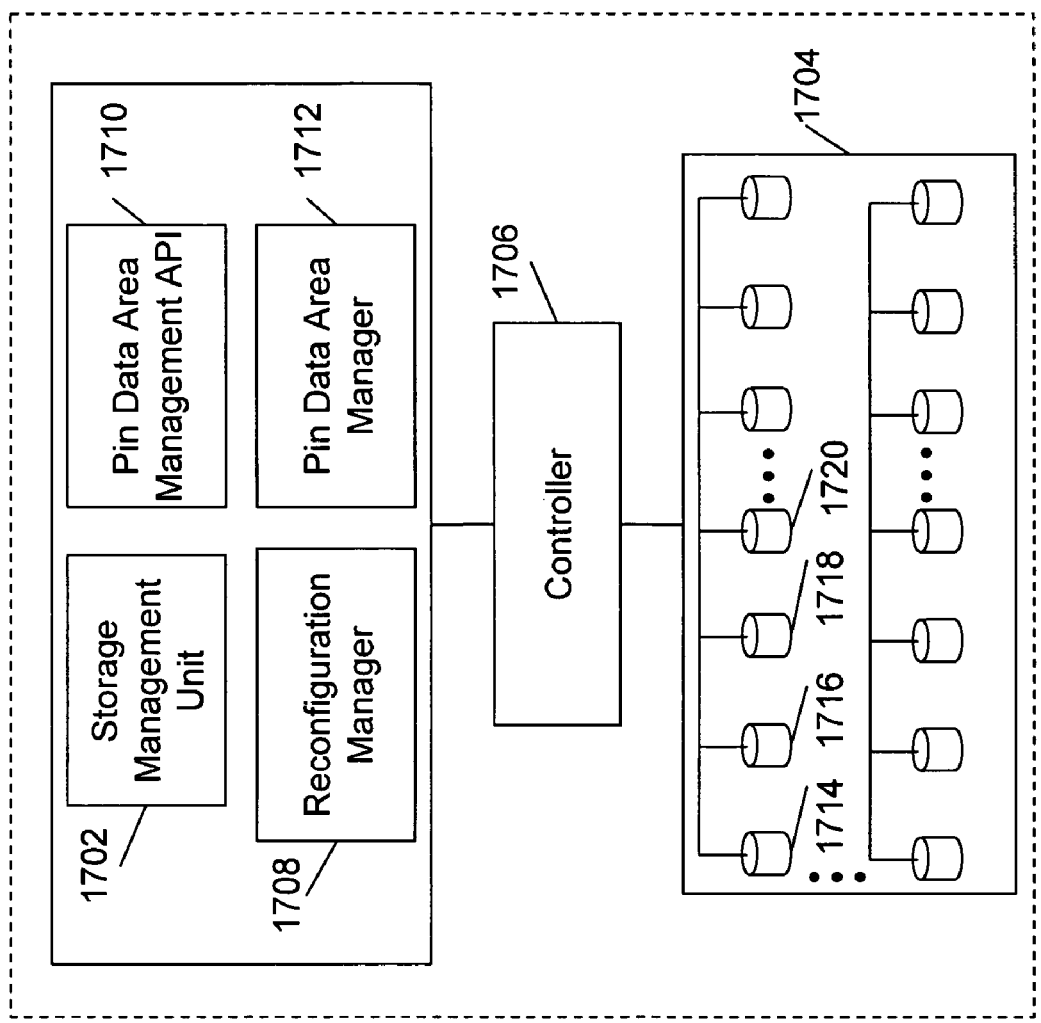
FIG. 17 is a diagram illustrating a data storage system, in accordance with one embodiment of the present invention.

FIG. 17 is a diagram illustrating data storage system 1602, in accordance with one embodiment of the present invention. Data storage system 1602 includes a storage management unit 1702, storage devices 1704, a controller 1706, a reconfiguration manager 1708, an auxiliary data area management Application Program Interface (API) 1710, and a data manager 1712. Examples of storage devices 1704 include, but are not limited to, hard disk drives, floppy drives, tape drives, compact disks, solid state memories, optical or magneto-optical drives, etc. It may also be possible to use combinations of different media drives. References herein to disk drives or data storage drives should therefore be construed broadly to cover any type of storage devices. Storage management unit 1702 is capable of preparing auxiliary data for a data unit or logical volume on a storage device of storage devices 1704 that is powered off during access of data storage system 1602. A "data unit," or variants thereof, refer to any stored amount of logical or virtual data, for example, a bit, byte, word, block, file, frame, etc. The data unit can further be divided or partitioned into logic blocks. In the data unit, the logical or virtual data is stored in the logic blocks.

"Auxiliary data," or variants thereof, include data that is stored in a plurality of data areas. Further, at least two data areas of the plurality of data areas are on different devices that can be power-regulated independent of each other. This can allow the auxiliary data to be accessed with reduced latency since at least one device storing the data area can be known or likely to be in a higher-power, lower-latency state. Auxiliary data can be restricted from being moved ("pinned" data) until the auxiliary data is "released." Auxiliary data includes, but is not limited to, data that is useful to the data unit, for example, 'metadata'. Metadata can include, for example, the time at which the data unit was created, size of the data unit, and name of the file corresponding to the data unit. Storage management unit 1702 is also capable of storing the auxiliary data on storage devices 1704 so that the auxiliary data is likely to be available on a powered on storage device, for example, a storage device 1714. In an embodiment of the present invention, the auxiliary data is stored in an auxiliary data area of each storage device of storage devices 1704. In an exemplary embodiment of the present invention, the auxiliary data area is a low Mean Time to First Byte (MTFB) area of each storage device of storage devices 1704, or effectively immediately accessible and available. In various embodiments of the present invention, the low MTFB area maps to a set of logic blocks of one or more data units of the data storage system. The set of logic blocks are set during configuration of data storage system 1602. Each storage device of storage devices 1704 further includes a high Mean Time to First Byte (MTFB) area for storing data other than auxiliary data.

The storage management unit 1702 is further capable of updating the auxiliary data. Controller 1706, which is coupled to storage devices 1704, facilitates the update of the auxiliary data by the storage management unit 1702. In an embodiment of the present invention, at least one storage device of storage devices 1704 having the latest update of the auxiliary data is always powered on. Reconfiguration manager 1708 reconfigures the auxiliary data area on all the storage devices of storage devices 1704. Auxiliary data area management API 1710 determines the set of logic blocks of one or more data units of data storage system 1602 that are to be managed in the auxiliary data areas of storage devices 1704. Auxiliary data area manager 1712 maintains the auxiliary data in storage devices 1704.

Figure 18:
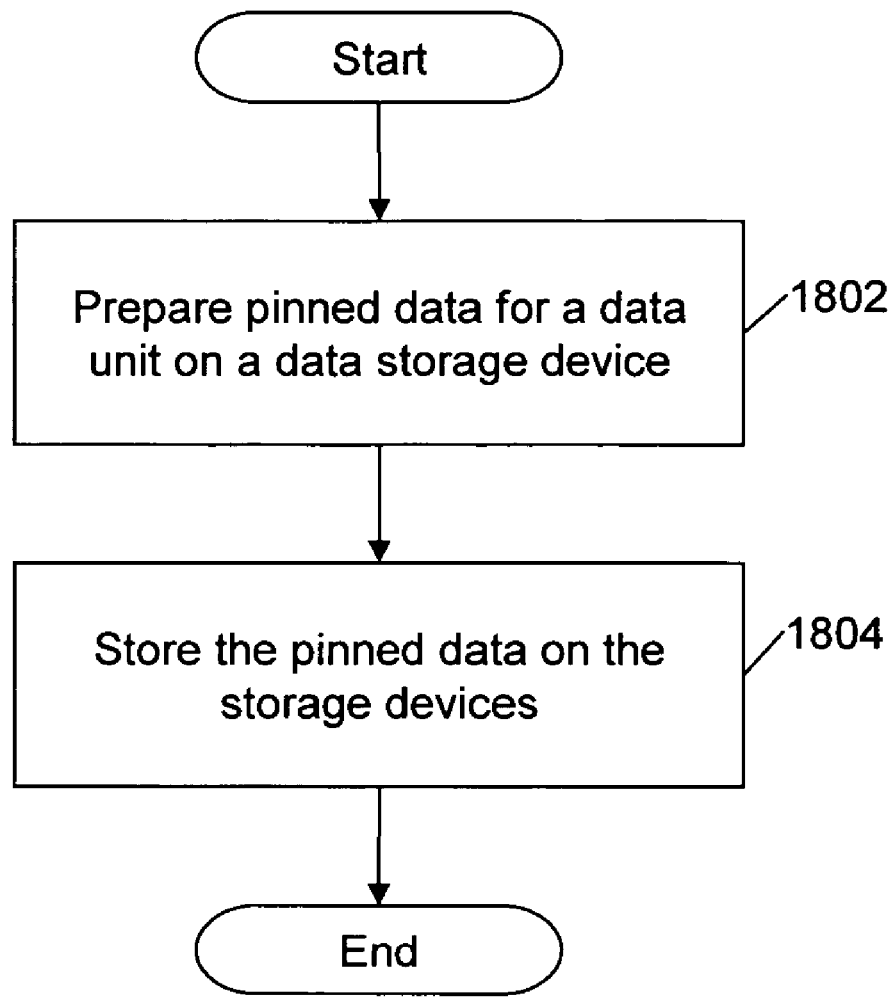
FIG. 18 is a flow diagram illustrating a method for preparing data units for access of a data storage system, in accordance with one embodiment of the present invention.

FIG. 18 is a flow diagram illustrating a method for preparing data units for access in data storage system 1602, in accordance with one embodiment of the present invention. In various embodiments of the present invention, the power required for preparing the auxiliary data is provided by the storage management unit 1702. At step 1802, the auxiliary data for the data unit on the storage device is prepared. Since all the storage devices of storage devices 1704 are not powered on at the same time, the auxiliary data is prepared for the storage device that will be powered off during the access request for the data unit. The auxiliary data is prepared so that it facilitates the access of data units of data storage system 1602. At step 1804, the auxiliary data is stored on storage devices 1704 so that the auxiliary data is likely to be available on the powered-on storage device. In an embodiment of the present invention, the auxiliary data is stored in all the storage devices of storage devices 1704. When the data storage system 1602 receives the access request for auxiliary data, the access request can now be served by any one of the powered-on storage devices of the data storage system 1602. However, if the access request is for particular data other than the auxiliary data, the storage device or storage devices that store the particular data are powered on, if they are already not powered on.

Figure 19:
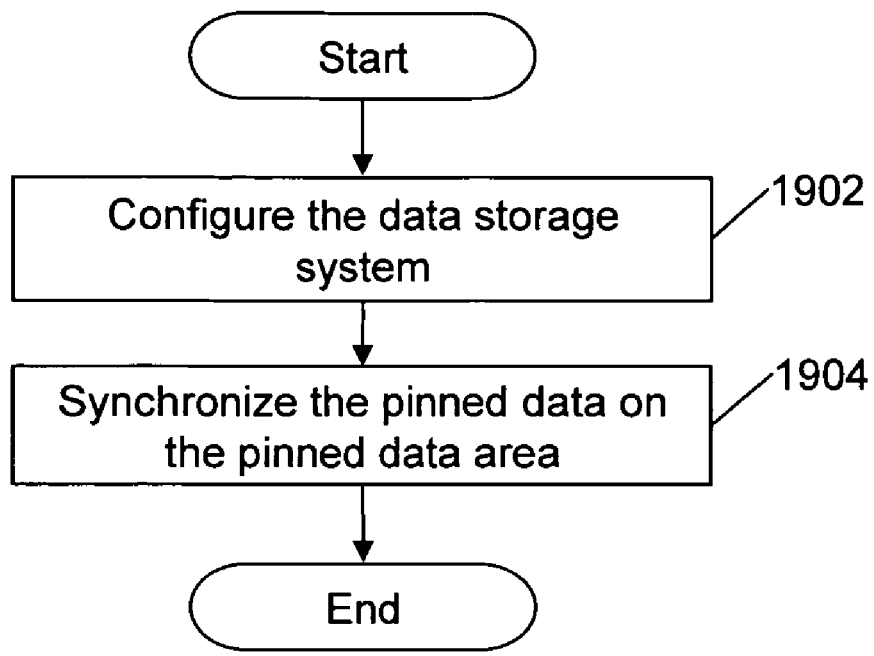
FIG. 19 is a flow diagram illustrating a method for preparing auxiliary data for a data unit, in accordance with another embodiment of the present invention.
Figure 20:
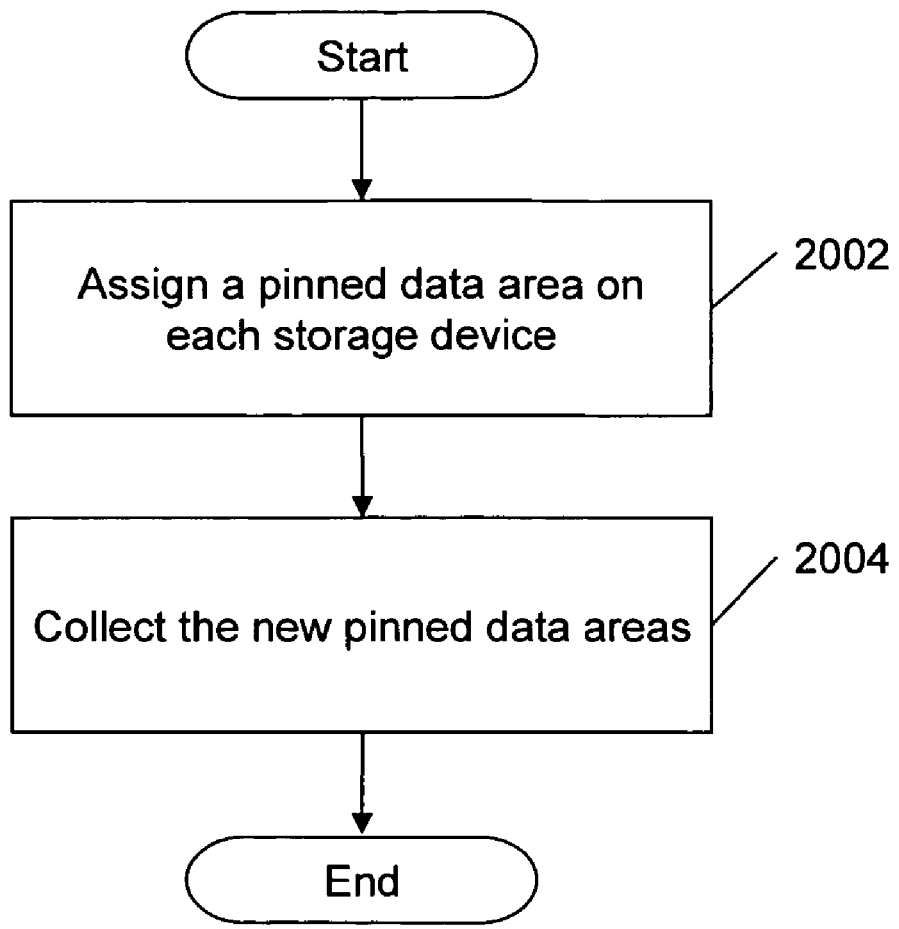
FIG. 20 is a flow diagram illustrating a method for configuring a data storage system, in accordance with one embodiment of the present invention.

FIG. 19 is a flow diagram illustrating a method for preparing the auxiliary data for the data unit, in accordance with an embodiment of the present invention. The auxiliary data is prepared when data storage system 1602 is offline, i.e., there is no interaction of data storage system 1602 with host 1604. In other words, data storage system 1602 does not receive or serve a request made by host 1604. At step 1902, data storage system 1602 is configured. The step of configuring data storage system 1602 is explained in detail in conjunction with FIG. 20. FIG. 20 is a flow diagram illustrating a method for configuring data storage system 1602, in accordance with one embodiment of the present invention. At step 2002, the auxiliary data area on each of the storage devices of data storage system 1602 is assigned to the set of logical blocks of one or more data units of data storage system 1602. At step 1904, the auxiliary data is collected from the auxiliary data areas to the set of logical blocks of the data units.

Data storage system 1602 is configured so that the data likely to be required during host access of data storage system 1602 is in the auxiliary data areas of storage devices 1704. In other words, the auxiliary data areas are mapped to the set of logical blocks so that the auxiliary data is always available with the set of logical blocks of the data units. Data storage system 1602 is configured during a boot cycle of data storage system 1602. In an embodiment of the present invention, storage management unit 1702 configures data storage system 1602. The storage management unit 1702 can again configure data storage system 1602 on a future boot cycle of data storage system 1602. This occurs, for example, when there is a change in host assignments of the auxiliary data.

Note that although the auxiliary data is generally described as being "always" available that substantial, or identical, benefits may be realized in embodiments where auxiliary data, or other data, is provided according the description herein but is available less than all of the time. For this reason, the use of "always" is intended to describe the cases where the data is available enough of the time so that the apparent effect on overall storage system performance is nonexistent, not apparent, or negligible.

After configuration, at step 1904, the auxiliary data in all data units of data storage system 1602 are synchronized. The data units of data storage system 1602 are synchronized so that all the data units have the same auxiliary data. After data storage system 1602 is synchronized, data storage system 1602 can go online. In other words, data storage system 1602 is ready for access by host 1604.

When host 1604 makes the access request, it is presented with a particular data unit, which is the subject of the access request. However, all the storage devices that physically store the data corresponding to the data unit may not be powered on. Therefore, the required data for which the access request has been made, may be on a powered off storage device. Controller 1706 now checks whether the access request is directed to the auxiliary data or particular data other than the auxiliary data. If the access request is for the particular data, the storage device or storage devices that store the particular data are powered on, if they are already not powered on. In case it is found that the access request is directed to the auxiliary data, the data unit serves the access request from a powered on storage device. In this case, the access request is served without delay. This is because the auxiliary data has already been prepared and stored on each of the storage devices of data storage system 1602 that are likely to be powered on. The access request can be a read operation or a write operation. In case of the read operation, the access request is served from any one of the powered-on storage devices of data storage system 1602. In case of the write operation, the data is written to the auxiliary data area on all the powered-on storage devices.

However, the same storage devices are not powered on all the time. The storage devices that are powered on at an instant of time depend on which data unit or units are subject of the access request at that instant of time. Therefore, after a write operation, the powered-on storage devices at that instant of time have modified auxiliary data. As other storage devices are powered on from a powered off state in response to new access requests, the modified auxiliary data is updated or synchronized on newly powered on storage devices. In other words, the auxiliary data is synchronized from one set of storage devices to a next set of storage devices when the next set of devices is powered on upon the access request. The auxiliary data is updated so that the newly powered on storage devices have a latest copy of the auxiliary data in the respective auxiliary data areas. In one embodiment of the present invention, the auxiliary data is updated by using a generation identification number. The generation identification number is incremented each time one of the storage devices that are powered on is powered off. This ensures that the storage device that will be powered on after a next boot of data storage system 1602 will have the latest copy of the auxiliary data. Further, each update of the auxiliary data is recorded by controller 1706. In this embodiment, the auxiliary data is updated if the generation identification number corresponding to the auxiliary data in a particular auxiliary data area is not latest.

Figure 21:
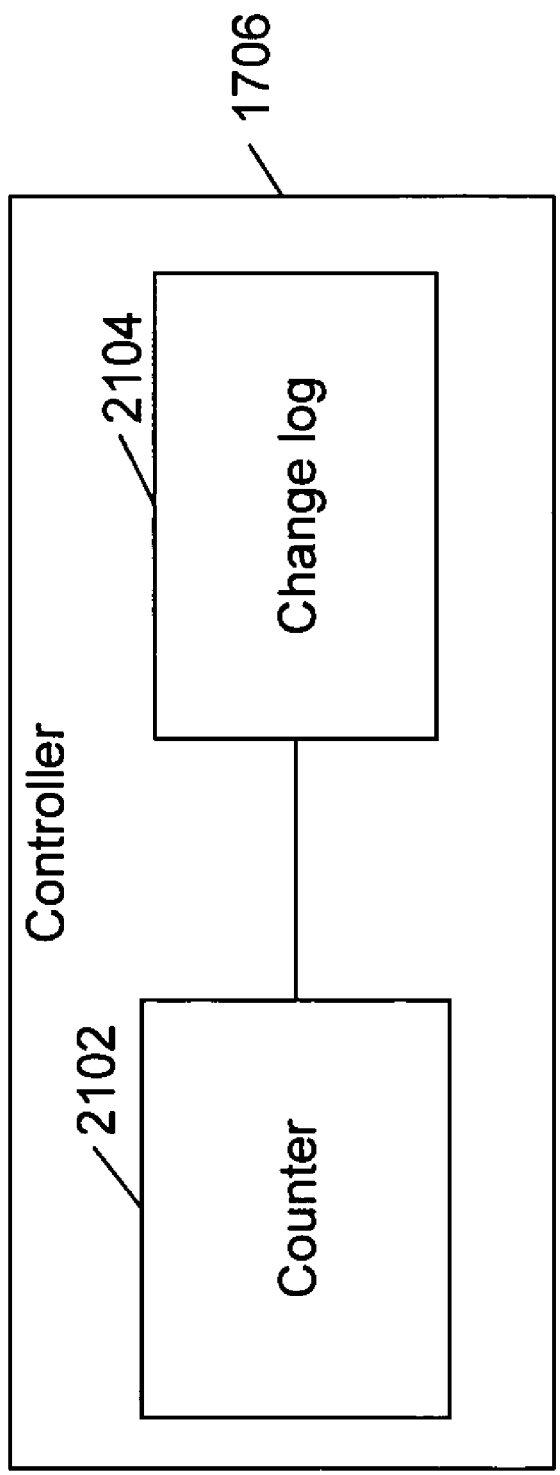
FIG. 21 is a diagram illustrating components of a controller, in accordance with one embodiment of the present invention.

FIG. 21 is a diagram illustrating the controller 1706, in accordance with one embodiment of the present invention. The controller 1706 includes a counter 2102 and a change log 2104. Counter 2102 increments the generation identification number corresponding to the auxiliary data area each time one of the powered on storage devices is being powered off. Change log 2104 stores the updates corresponding to each increment of the generation identification number. Therefore, counter 2102 and change log 2104 facilitate updating of the auxiliary data in the auxiliary data area. For example, an auxiliary data area of the storage device that is being powered on includes auxiliary data 'X', which has a generation identification number '10'. Suppose, the latest value of the generation identification number is '16' and the corresponding auxiliary data area includes auxiliary data 'Y'. Then change log 2104 will include entries corresponding to the increment in the generation identification number from '10' to '16', i.e., change in data from 'X' to 'Y'. The auxiliary data in the pinned area with the generation identification number '10' is now updated for only the change from 'X' to 'Y'. This eliminates the requirement for rewriting the modified auxiliary data on the auxiliary data area of each storage device that is being powered on. Further, the generation identification number corresponding to the storage devices with updated auxiliary data is incremented from '10' to '16'.

During the period data storage system 1602 is online, the auxiliary data is not synchronized with the data units. However, after a considerable amount of time the data storage system 1602 is online, the requirements of data access may change. Therefore, a reconfiguration of data storage system 1602 may be required to update the data units so that they can efficiently address the access requests from the auxiliary data areas.

Figure 22:
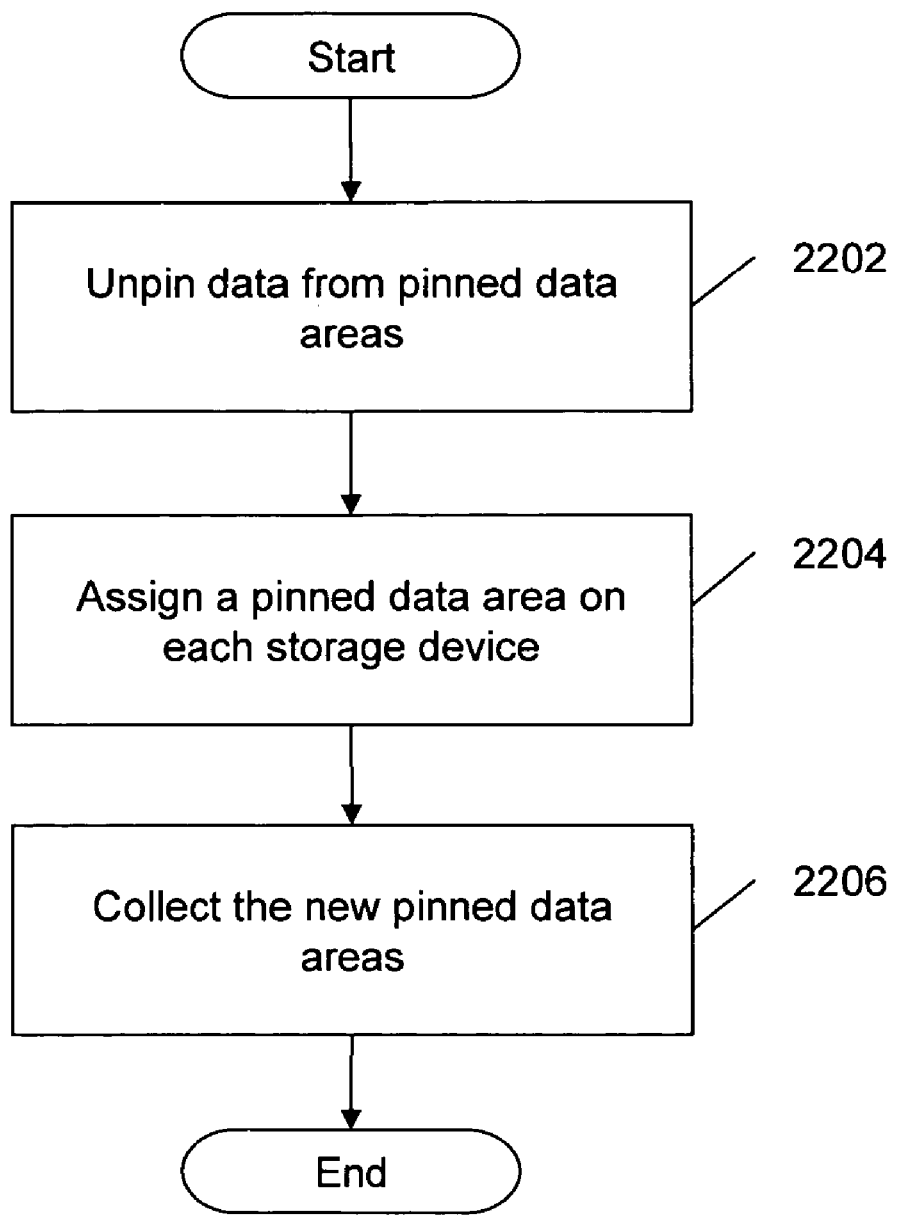
FIG. 22 is a flow diagram illustrating a method for reconfiguring data storage system, in accordance with one embodiment of the present invention.

FIG. 22 is a flow diagram illustrating a method for reconfiguring data storage system 1602, in accordance with one embodiment of the present invention. Data storage system 1602 is reconfigured by reconfiguration manager 1708. At step 2202, the auxiliary data from the auxiliary data areas that are not required in the configuration anymore, are unpinned or released to the storage devices. At step 2204, new auxiliary data areas are assigned to the set of logical blocks of one or more of the data units of data storage system 1602. At step 2206, the auxiliary data are collected from the set of logical blocks of these data units to the new auxiliary data areas. In an embodiment of the present invention, the configuration can be modified using a vendor unique command.

In an embodiment of the present invention, the vendor unique command is received through an in-band interface, i.e., the command can be directly provided to the reconfiguration manager 1708 via a small computer system interface (SCSI). In another embodiment of the present invention, the vendor unique command is received through an out-of-band interface, i.e., the command is received by the reconfiguration manager 1708 via a network such as a local area network and a wide area network. After the set of logical blocks are modified, the auxiliary data in the auxiliary data areas are synchronized. The auxiliary data areas are synchronized so that all the auxiliary data areas have the same auxiliary data. In various embodiment of the present invention, data storage system 1602 is reconfigured so that the auxiliary data that is not required for future use is unpinned. Also, new auxiliary data is added or pinned in the auxiliary data area.

Further, a set of storage devices of the storage device 1704 are maintained, in accordance with one embodiment of the present invention. The set of storage devices are kept powered on for maintaining the data. The storage devices in the set of storage devices are rotated in a round robin manner in order to increase life of storage devices 1704 in data storage system 1602. Auxiliary data area manager 1712 controls which storage devices are kept on. The powered-on storage devices in the set of storage devices are periodically swapped with storage devices that are powered off. In other words, some of the storage devices that are presently powered off are powered on to replace some of the presently powered on storage devices. These presently powered on storage devices are then powered off. In an embodiment of the present invention, a minimum number of powered-on storage devices are swapped with the storage devices that are powered off. In another embodiment of the present invention, the period for periodically swapping the storage devices is provided by a Self-Monitoring, Analysis and Reporting Technology (SMART) data. The SMART data keeps an account of the time, for which each storage device in the set of storage devices is powered on. In yet another embodiment of the present invention, the set of the storage devices includes those storage devices that have been powered on for a least time with respect to the time for which other storage devices of storage devices 1704 have been powered on.

The embodiments described above ensure that the auxiliary data required by the storage management unit of the data storage system is likely to be available on a powered-on storage device on receiving the access request. Further, the embodiments work within a power budget, as preparing the data units for access does not require any additional power from the data storage system. The power is provided by the storage management unit for preparing the data units, or is made available in the background mode of operation. In the online mode of operation, the auxiliary data is accessed from the powered on storage devices. The method and system enable detection and subsequent maintenance of degraded storage devices in the data storage system. Further, the method and system ensure that the maintenance is carried out when the storage management unit is idle for a predetermined time.

Although the present invention has been described with respect to the specific embodiments thereof, these embodiments are descriptive, and not restrictive, of the present invention, for example, it is apparent that specific values and ranges of parameters can vary from those described herein. The values of the threshold parameters, p, c, r, m, s, t, etc., can change as new experimental data become known, as preferences or overall system characteristics change, or to achieve improved or desirable performance. Although specific formulas for calculating values and defining variables are presented, other ways to obtain values, variables or parameters can be used.

Although terms such as "storage device," "disk drive," etc., are used, any type of storage unit can be adaptable to work with the present invention. For example, disk drives, tape drives, random access memory (RAM), etc., can be used. Different present and future storage technologies can be used such as those created with magnetic, solid-state, optical, bioelectric, nano-engineered, or other techniques. Different arrangements and architectures of storage systems can be employed.

Storage units can be located either internally inside a computer or outside a computer in a separate housing that is connected to the computer. Storage units, controllers and other components of systems discussed herein can be included at a single location or separated at different locations. Such components can be interconnected by any suitable means such as with networks, communication links or other technology. Although specific functionality may be discussed as operating at, or residing in or with, specific places and times, in general the functionality can be provided at different locations and times. For example, functionality such as data protection steps can be provided at different tiers of a hierarchical controller. Any type of RAID or RAIV arrangement or configuration can be used.

In the description herein, numerous specific details are provided, such as examples of components and/or methods, to provide a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "processor" or "process" includes any human, hardware and/or software system, mechanism, or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Moreover, certain portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. In addition, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the present invention to the precise forms disclosed herein. While specific embodiments of, and examples for, the present invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes, and substitutions are intended in the foregoing disclosures. It will be appreciated that in some instances some features of embodiments of the present invention will be employed without a corresponding use of other features without departing from the scope and spirit of the present invention as set forth. Therefore, many modifications may be made to adapt a particular situation or material to the essential scope and spirit of the present invention. It is intended that the present invention not be limited to the particular terms used in following claims and/or to the particular embodiment disclosed as the best mode contemplated for carrying out this invention, but that the present invention will include any and all embodiments and equivalents falling within the scope of the appended claims.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for preparing data units for access in a data storage system, the data storage system comprising a plurality of storage devices having data units, wherein not all of the storage devices are powered on at the same time, the method comprising:
   preparing auxiliary data for a data unit on a data unit storage device that will be powered down during an access request of the data unit; and
   storing the auxiliary data on one or more of the storage devices so that the auxiliary data is always available on a powered-on storage device when the data unit is a subject of an access request while the data unit storage device is powered down, wherein after receiving the access request, the powered-on storage device is not powered-on from a powered down state to respond to the access request.

2. The method of claim 1, wherein the auxiliary data is stored on all of the storage devices.

3. The method of claim 1, further comprising:
   using an auxiliary data area on a storage device to store the auxiliary data; and
   updating the auxiliary data.

4. The method of claim 3, further comprising:
   using a change log and a generation identification number to update the auxiliary data.

5. The method of claim 4, wherein the generation identification number is incremented each time the auxiliary data is updated.

6. The method of claim 4, wherein the auxiliary data is updated on the auxiliary data area when the generation identity number is not latest.

7. The method of claim 4, wherein the change log includes updates corresponding to each increment of the generation identification number.

8. The method of claim 3, wherein the auxiliary data is updated from one set of storage devices to a next set of storage devices when the next set of storage devices is being powered on upon the access request.

9. The method of claim 3, wherein updating the auxiliary data comprises:
   modifying the auxiliary data on all of powered-on storage devices of the data storage system when the access request is a write operation.

10. The method of claim 1, wherein the auxiliary data is read from one of powered-on storage devices of the data storage system when the access request is a read operation.

11. The method of claim 1, wherein the access request is received from a host.

12. The method of claim 1, wherein preparing the auxiliary data for the data unit comprises:
    configuring the data storage system during a boot cycle of the data storage system; and
    synchronizing the auxiliary data in all data units of the data storage system.

13. The method of claim 12, wherein configuring the data storage system comprises:
    assigning an auxiliary data area on each storage device of the data storage system to a set of logical blocks of one or more data units of the data storage system; and
    collecting the auxiliary data from the auxiliary data area to the set of logical blocks of the one or more data units.

14. The method of claim 12, further comprising:
    reconfiguring auxiliary data areas on all of the storage devices.

15. The method of claim 14, wherein reconfiguring the auxiliary data areas comprises:
    unpinning auxiliary data from the auxiliary data areas that are no longer in the configuration;
    assigning new auxiliary data areas to the set of logical blocks of the one or more data units; and
    collecting data from the set of logical blocks of the one or more data units to the new auxiliary data areas.

16. The method of claim 15, wherein reconfiguring the auxiliary data areas further comprises:
    modifying the set of logical blocks by using a vendor unique command that is received through one of an out-of-band and an in-band interface.

17. The method of claim 16, further comprising:
    synchronizing data in the auxiliary data areas.

18. The method of claim 1, further comprising:
    maintaining the auxiliary data on a set of storage devices of the plurality of storage devices in a background mode when a storage management unit of the data storage system is idle for a predetermined time.

19. The method of claim 18, wherein maintaining the auxiliary data comprises:
    powering on the set of storage devices in the background mode.

20. The method of claim 19, wherein powering on the set of storage devices further comprises:
    periodically swapping powered-on storage devices in the set of storage device with storage devices that are powered-off.

21. The method of claim 20, wherein a period for periodically swapping the storage devices and the storage devices to be swapped are provided by a Self-Monitoring, Analysis and Reporting Technology (SMART) data, wherein the SMART data keeps an account of time for which each storage device in the set of storage devices is powered-on.

22. The method of claim 20, the set of storage devices includes storage devices with least powered-on times.

23. A data storage system comprising:
    a plurality of storage devices having data units, wherein not all of the storage devices are powered on at the same time;
    a storage management unit capable of:
    preparing auxiliary data for a data unit on a data unit storage device that will be powered down during an access request of the data unit; and storing the auxiliary data on one or more of the storage devices in the plurality of storage devices so that the auxiliary data is always available on a powered-on storage device when the data unit is the subject of an access request while the data unit storage device is powered down, wherein after receiving the access request, the powered-on storage device is not powered-on from a powered down state to respond to the access request.

24. The data storage system of claim 23, further comprising a controller coupled to each storage device of the plurality of storage devices, wherein the controller comprises:
- a counter for incrementing a generation identification number, wherein the generation identification number is incremented each time the auxiliary data area is updated; and
- a change log for storing updates corresponding to each increment of the generation identification number.

25. The data storage system of claim 24, wherein at least one storage device of the plurality of the storage devices comprising a latest update of the auxiliary data is always powered-on.

26. The data storage system of claim 23, further comprising a reconfiguration manager for reconfiguring auxiliary data areas on all of the storage devices.

27. The data storage system of claim 23, further comprising an auxiliary data area management application program interface for determining logical blocks to be managed in the auxiliary data areas.

28. The data storage system of claim 23, further comprising an auxiliary data area manager for maintaining the auxiliary data on the plurality of storage devices in a background mode when the storage management unit is idle for a predetermined time.

29. The data storage system of claim 23, wherein the auxiliary data area is a low Mean Time to First Byte (MTFB) area in each storage device of the plurality of storage devices.

30. The data storage system of claim 29, wherein the low MTFB area maps to a set of logical blocks, wherein the set of logical blocks is set during configuration of the data storage system.

31. An apparatus comprising:
- a processor for executing instructions; and
- a machine-readable medium including:
- one or more instructions for preparing auxiliary data for a data unit on a data unit drive that will be powered-off during an access request of the data unit; and
- one or more instructions for storing the auxiliary data on one or more storage devices so that the auxiliary data is always available on a powered-on device when the data unit is the subject of an access request while the data unit drive is powered down, wherein after receiving the access request, the powered-on storage device is not powered-on from a powered down state to respond to the access request.

32. A machine-readable medium including instructions executable by a processor for preparing data units for access in a data storage system, the data storage system comprising a plurality of storage devices having data units, wherein not all of the storage devices are powered-on at the same time, the machine readable medium comprising:
- one or more instructions for preparing auxiliary data for a data unit on a data unit drive that will be powered-off during an access request of the data unit; and
- one or more instructions for storing the auxiliary data on one or more of the storage devices so that the auxiliary data is always accessible and available on a powered-on device when the data unit is the subject of an access request while the data unit drive is powered down, wherein after receiving the access request, the powered-on storage device is not powered-on from a powered down state to respond to the access request.

33. A method for preparing data units for access in a data storage system, the data storage system comprising a plurality of storage devices having data units, wherein not all of the storage devices are powered on at the same time, the method comprising:
- storing a data unit on a first storage device;
- storing auxiliary data for the data unit on a second storage device that is in a powered-on state;
- receiving an access request, wherein the first storage device is in a powered down state when the access request is received; and
- responding to the access request using the auxiliary data that is stored on the second storage device that is powered-on, the second storage device not being powered on from a powered down state to service the access request.

34. The method of claim 33, further comprising:
determining if the access request is for the auxiliary data; responding to the request using the auxiliary data.

35. The method of claim 33, further comprising:
determining that the second storage device will be powered down; and
moving the auxiliary data to a third storage device that is powered on such that the auxiliary data is available on a powered on storage device.

36. The method of claim 33, wherein the auxiliary data is ensured to be on a powered on storage drive before the access request is made.

37. The method of claim 33, further comprising:
determining if the access request is for the data unit; and powering on the first storage device if the access request is for the data unit; and
servicing the request using the data unit on the first storage device.

38. The method of claim 33, wherein the auxiliary data is stored on one or more additional storage devices other than the second storage device.

* * * * *